US012719617B2

(12) United States Patent
Dimou et al.

(10) Patent No.: US 12,719,617 B2
(45) Date of Patent: Aug. 25, 2026

(54) STRATEGIES FOR DEFERRING SEMI-PERSISTENT SCHEDULING UPLINK CONTROL CHANNEL TRANSMISSIONS

(71) Applicant: QUALCOMM Incorporated, San Diego, CA (US)

(72) Inventors: Konstantinos Dimou, New York, NY (US); Yan Zhou, San Diego, CA (US); Yi Huang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 358 days.

(21) Appl. No.: 18/547,145

(22) PCT Filed: Apr. 5, 2022

(86) PCT No.: PCT/US2022/071559
§ 371 (c)(1),
(2) Date: Aug. 18, 2023

(87) PCT Pub. No.: WO2022/217230
PCT Pub. Date: Oct. 13, 2022

(65) Prior Publication Data

US 2024/0129071 A1 Apr. 18, 2024

(30) Foreign Application Priority Data

Apr. 9, 2021 (GR) .............................. 20210100246

(51) Int. Cl.
*H04L 1/1829* (2023.01)
*H04W 72/11* (2023.01)

(52) U.S. Cl.
CPC .......... *H04L 1/1854* (2013.01); *H04W 72/11* (2023.01)

(58) Field of Classification Search
CPC ... H04L 1/1854; H04L 1/1607; H04L 5/0055; H04L 1/1614; H04L 1/1812; H04L 1/1861; H04L 5/001; H04W 72/11
See application file for complete search history.

(56) References Cited

U.S. PATENT DOCUMENTS

2020/0374089 A1 11/2020 Yang et al.
2022/0399979 A1* 12/2022 Gao ...................... H04L 1/1614

(Continued)

FOREIGN PATENT DOCUMENTS

WO WO-2020176546 9/2020
WO WO 2021088800 A1 * 5/2021

OTHER PUBLICATIONS

U.S. Appl. No. 63/168,278_Specification_Mar. 31, 2021 (Year: 2021).*

(Continued)

*Primary Examiner* — Rushil P. Sampat
(74) *Attorney, Agent, or Firm* — Holland & Hart LLP

(57) ABSTRACT

Methods, systems, and devices for wireless communications are described. A user equipment (UE) may generate first and second sets of feedback bits associated with first and second downlink transmissions, respectively, the first and second sets of feedback bits scheduled for transmission in a first set of uplink symbols. The UE may identify, based on a change in a format associated with the first set of uplink symbols, that only a subset of the first set of uplink symbols is available for transmission of the first set of feedback bits and the second set of feedback bits. The UE may determine to defer transmission of one or both of the first set of feedback bits and the second set of feedback bits to a second set of uplink symbols based on availability of the subset of the first set of uplink symbols and on a deferment scheme.

30 Claims, 18 Drawing Sheets

(56) References Cited

U.S. PATENT DOCUMENTS

| | | | | |
|---|---|---|---|---|
| 2023/0023656 | A1* | 1/2023 | Rastegardoost | H04W 72/0446 |
| 2023/0126768 | A1* | 4/2023 | Wang | H04L 5/0055 370/336 |
| 2023/0163899 | A1* | 5/2023 | Chien | H04L 1/1858 370/336 |
| 2024/0147453 | A1* | 5/2024 | Panteleev | H04L 1/1854 |
| 2024/0195536 | A1* | 6/2024 | Kittichokechai | H04L 1/1614 |

OTHER PUBLICATIONS

International Search Report and Written Opinion—PCT/US2022/071559—ISA/EPO—Jun. 24, 2022.

Qualcomm Incorporated: "HARQ-ACK Enhancement for IOT and URLLC", 3GPP TSG RAN WG1 #103-e, R1-2009257, 3rd Generation Partnership Project, Mobile Competence Centre, 650, Route Des Lucioles, F-06921, Sophia-Antipolis Cedex, France, vol. RAN WG1, No. e-Meeting, Oct. 26, 2020-Nov. 13, 2020, Oct. 24, 2020, XP051946920, 11 Pages, Section 2 "Transmisison of dropped SPS A/N", Section 5 "Retransmission of cancelled, HARQ-ACK", Section 1—Introduction, pp. 1,2,6,7, figures 1,7, paragraph 007.

* cited by examiner 105-b

Figure 3:
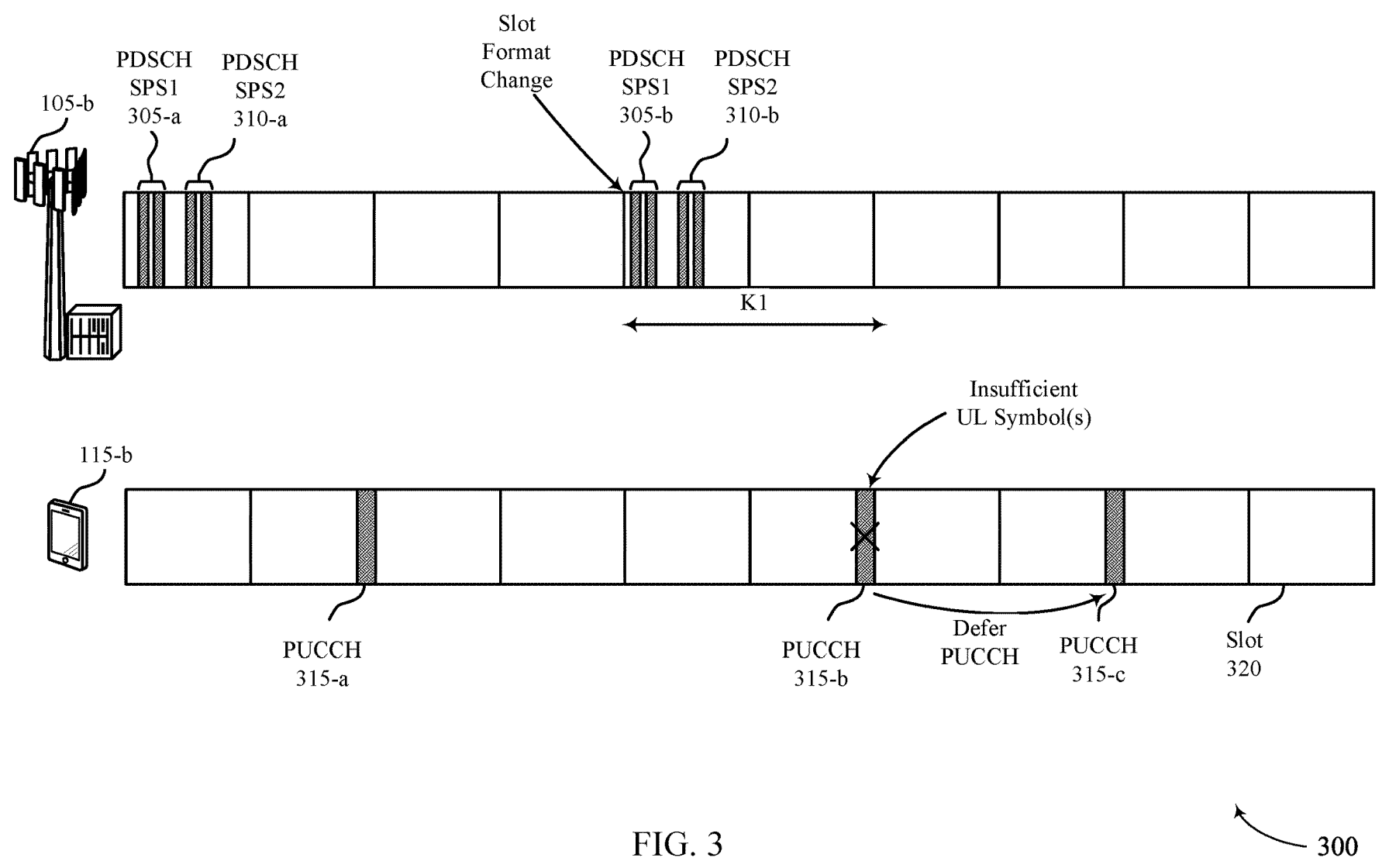

PDSCH SPS1 305-a

PDSCH SPS2 310-a

Slot Format Change

PDSCH SPS1 305-b

PDSCH SPS2 310-b

K1

115-b

PUCCH 315-a

Insufficient UL Symbol(s)

PUCCH 315-b

Defer PUCCH

PUCCH 315-c

Slot 320

Figure 4:
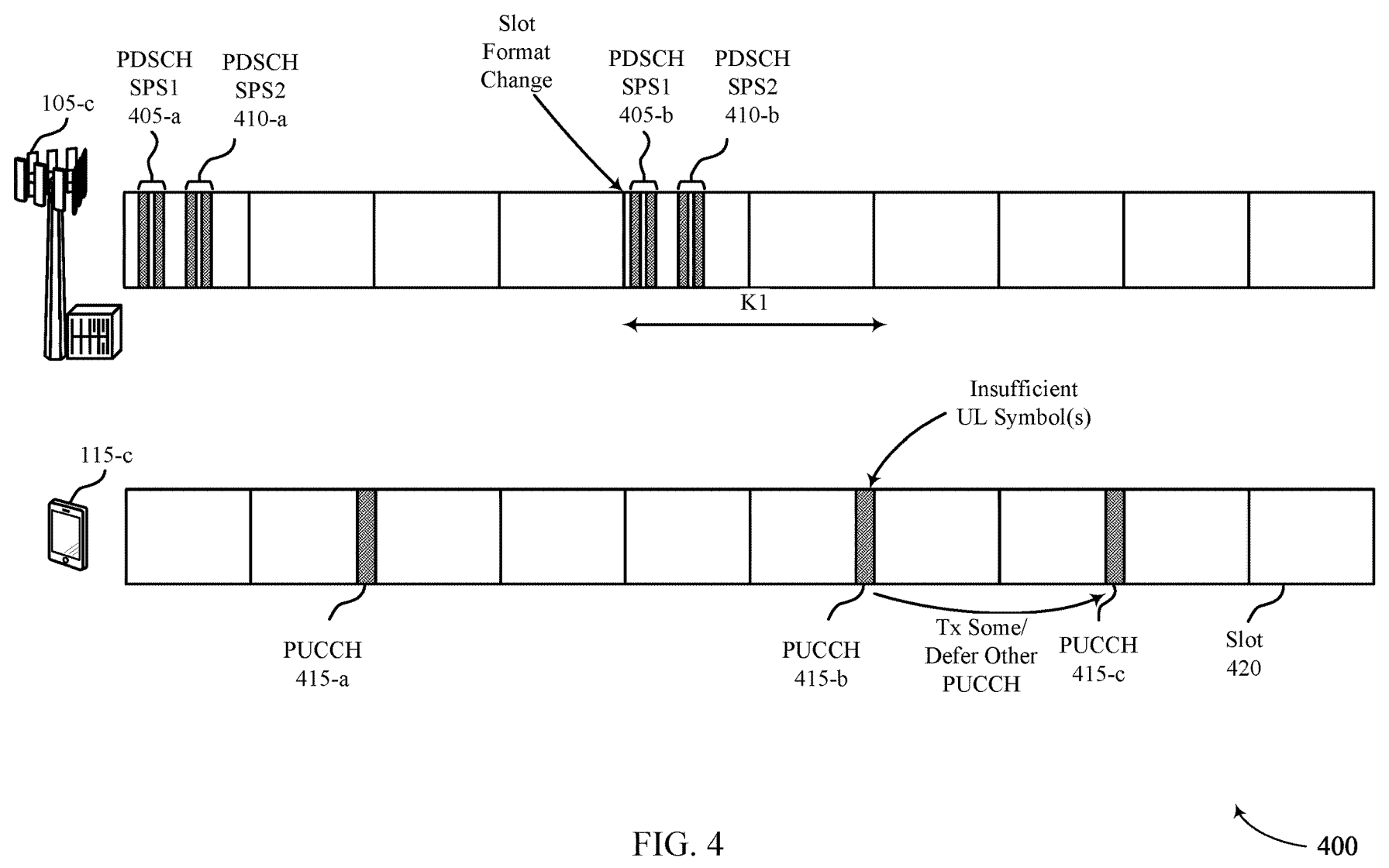

PDSCH SPS1 405-a

PDSCH SPS2 410-a

Slot Format Change

PDSCH SPS1 405-b

PDSCH SPS2 410-b

K1

115-c

PUCCH 415-a

PUCCH 415-b

Insufficient UL Symbol(s)

Tx Some/ Defer Other PUCCH

PUCCH 415-c

Slot 420

Figure 17:
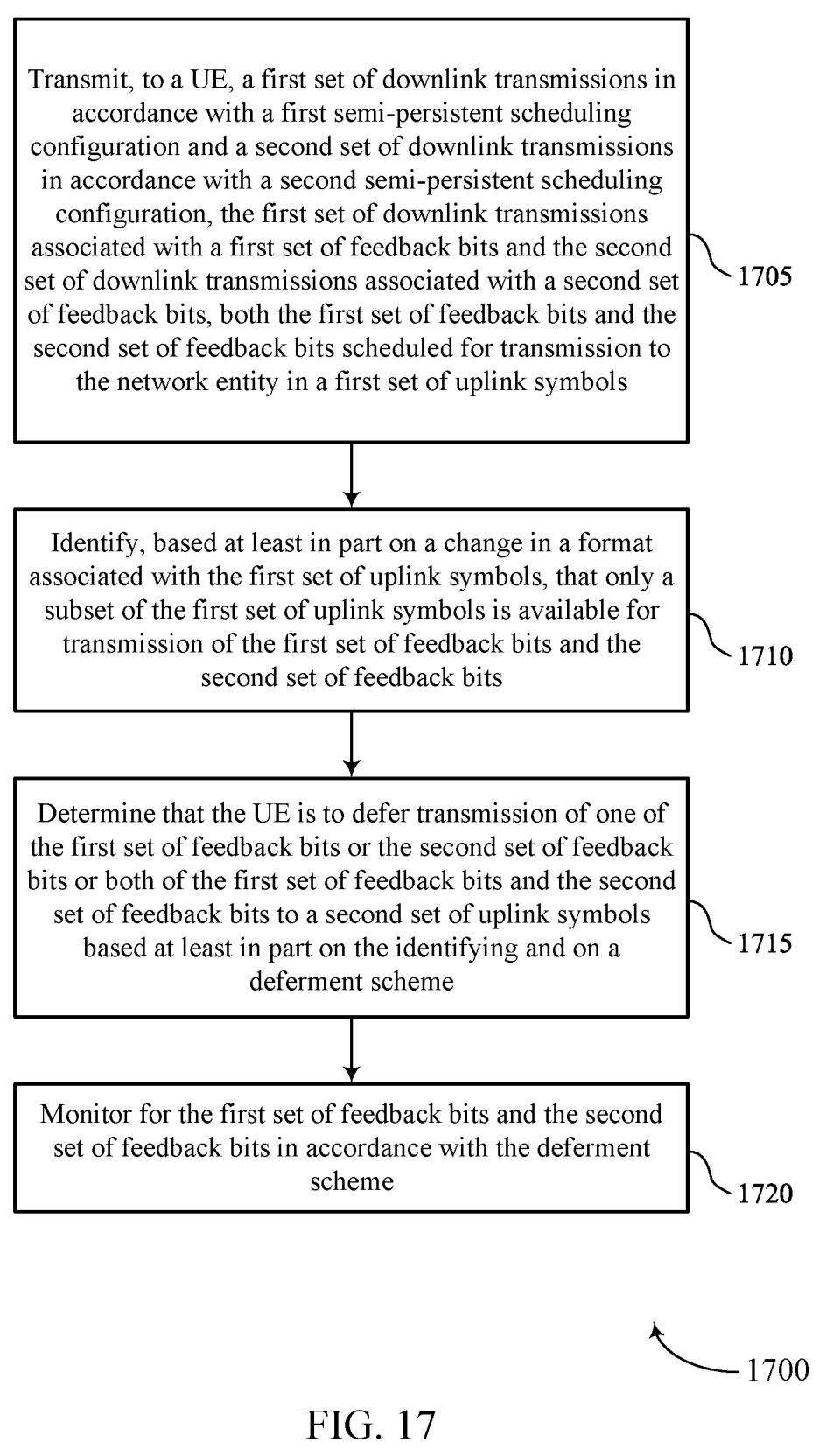

Transmit, to a UE, a first set of downlink transmissions in accordance with a first semi-persistent scheduling configuration and a second set of downlink transmissions in accordance with a second semi-persistent scheduling configuration, the first set of downlink transmissions associated with a first set of feedback bits and the second set of downlink transmissions associated with a second set of feedback bits, both the first set of feedback bits and the second set of feedback bits scheduled for transmission to the network entity in a first set of uplink symbols

1705

Identify, based at least in part on a change in a format associated with the first set of uplink symbols, that only a subset of the first set of uplink symbols is available for transmission of the first set of feedback bits and the second set of feedback bits

1710

Determine that the UE is to defer transmission of one of the first set of feedback bits or the second set of feedback bits or both of the first set of feedback bits and the second set of feedback bits to a second set of uplink symbols based at least in part on the identifying and on a deferment scheme

1715

Monitor for the first set of feedback bits and the second set of feedback bits in accordance with the deferment scheme

STRATEGIES FOR DEFERRING SEMI-PERSISTENT SCHEDULING UPLINK CONTROL CHANNEL TRANSMISSIONS

CROSS REFERENCE

The present Application is a 371 national stage filing of International PCT Application No. PCT/US2022/071559 by DIMOU et al. entitled "STRATEGIES FOR DEFERRING SEMI-PERSISTENT SCHEDULING UPLINK CONTROL CHANNEL TRANSMISSIONS," filed Apr. 5, 2022; and claims priority to Greece Patent Application No. 20210100246 by DIMOU et al., entitled "STRATEGIES FOR DEFERRING SEMI-PERSISTENT SCHEDULING UPLINK CONTROL CHANNEL TRANSMISSIONS," filed Apr. 9, 2021, each of which is assigned to the assignee hereof, and each of which is expressly incorporated by reference in its entirety herein.

TECHNICAL FIELD

The following relates to wireless communications, including strategies for deferring semi-persistent scheduling uplink control channel transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations (or other network entities) or one or more network access nodes, each simultaneously supporting communication for multiple communication devices, which may be otherwise known as user equipment (UE).

In some wireless communications systems, a UE may be configured to transmit feedback based on monitoring for transmissions according to one or more semi-persistent scheduling (SPS) configurations. But in certain situations, changes to the format of scheduled slot(s)/symbol(s) may make transmitting feedback difficult.

SUMMARY

The described techniques relate to improved methods, systems, devices, and apparatuses that support strategies for deferring semi-persistent scheduling (SPS) uplink control channel transmissions. Generally, the described techniques provide for enabling a user equipment (UE) to apply a deferment scheme for transmitting or deferring some or all of the uplink control information (UCI) feedback bits when a change in the slot format results in the uplink symbols scheduled to transmit the UCI feedback bits no longer being able to carry all of the UCI bits. A UE may monitor for multiple SPS transmissions from a network entity (e.g., downlink transmissions according to a first SPS configuration, according to a second SPS configuration). Based on the monitoring, the UE may generate SPS feedback bits (e.g., acknowledgment (ACK) or negative ACK (NACK) bits) scheduled for transmission to the network entity in a first set of uplink symbols. The UE may identify or otherwise determine that the format in the uplink symbols originally scheduled to carry the UCI feedback bits (e.g., the first set of uplink symbols) has changed such that only a subset of the uplink symbols originally scheduled are still available. Accordingly, the UE may identify or otherwise apply a deferment scheme in combination with the available subset of uplink symbols to determine whether to defer some or all of the UCI feedback bits (e.g., a first set of feedback bits and/or a second set of feedback bits) to other uplink symbols (e.g., a second set of uplink symbols). The deferment scheme may be autonomously identified and applied by the UE or may be configured for the UE by the network entity. Accordingly, the UE may transmit or otherwise provide the UCI feedback bits (e.g., the first and second sets of feedback bits) to the network entity according to the deferment scheme. For example, the UE may defer both sets (e.g., all) of the UCI feedback bits to a second later set of uplink symbols or may transmit one set (e.g., some) of the UCI feedback bits in the first set of uplink symbols and defer the other UCI feedback bits to the second set of uplink symbols. In some cases, the second set of uplink symbols may already carry existing, non-deferred UCI bits to be transmitted, and the UE may make the deferment determination based on whether the UE can multiplex the deferred SPS feedback bits and the non-deferred UCI bits in the second set of uplink symbols.

A method for wireless communication at a UE is described. The method may include generating a first set of feedback bits associated with a first set of downlink transmissions of a first SPS configuration and a second set of feedback bits associated with a second set of downlink transmissions of a second SPS configuration, both the first set of feedback bits and the second set of feedback bits scheduled for transmission to a network entity in a first set of uplink symbols, identifying, based on a change in a format associated with the first set of uplink symbols, that only a subset of the first set of uplink symbols is available for transmission of the first set of feedback bits and the second set of feedback bits, determining to defer transmission of one of the first set of feedback bits or the second set of feedback bits or both of the first set of feedback bits and the second set of feedback bits to a second set of uplink symbols based on the identifying and on a deferment scheme, and transmitting the first set of feedback bits and the second set of feedback bits to the network entity in accordance with the deferment scheme.

An apparatus for wireless communication at a UE is described. The apparatus may include at least one processor, and memory coupled (e.g., operatively, communicatively, functionally, electronically, or electrically) with the at least one processor, the memory storing instructions executable by the at least one processor to cause the apparatus to generate a first set of feedback bits associated with a first set of downlink transmissions of a first SPS configuration and a second set of feedback bits associated with a second set of downlink transmissions of a second SPS configuration, both the first set of feedback bits and the second set of feedback bits scheduled for transmission to a network entity in a first set of uplink symbols, identify, based on a change in a format associated with the first set of uplink symbols, that only a subset of the first set of uplink symbols is available for transmission of the first set of feedback bits and the second set of feedback bits, determine to defer transmission of one of the first set of feedback bits or the second set of feedback bits or both of the first set of feedback bits and the second set of feedback bits to a second set of uplink symbols based on the identifying and on a deferment scheme, and transmit the first set of feedback bits and the second set of feedback bits to the network entity in accordance with the deferment scheme.

Another apparatus for wireless communication at a UE is described. The apparatus may include means for generating a first set of feedback bits associated with a first set of downlink transmissions of a first SPS configuration and a second set of feedback bits associated with a second set of downlink transmissions of a second SPS configuration, both the first set of feedback bits and the second set of feedback bits scheduled for transmission to a network entity in a first set of uplink symbols, means for identifying, based on a change in a format associated with the first set of uplink symbols, that only a subset of the first set of uplink symbols is available for transmission of the first set of feedback bits and the second set of feedback bits, means for determining to defer transmission of one of the first set of feedback bits or the second set of feedback bits or both of the first set of feedback bits and the second set of feedback bits to a second set of uplink symbols based on the identifying and on a deferment scheme, and means for transmitting the first set of feedback bits and the second set of feedback bits to the network entity in accordance with the deferment scheme.

A non-transitory computer-readable medium storing code for wireless communication at a UE is described. The code may include instructions executable by at least one processor to generate a first set of feedback bits associated with a first set of downlink transmissions of a first SPS configuration and a second set of feedback bits associated with a second set of downlink transmissions of a second SPS configuration, both the first set of feedback bits and the second set of feedback bits scheduled for transmission to a network entity in a first set of uplink symbols, identify, based on a change in a format associated with the first set of uplink symbols, that only a subset of the first set of uplink symbols is available for transmission of the first set of feedback bits and the second set of feedback bits, determine to defer transmission of one of the first set of feedback bits or the second set of feedback bits or both of the first set of feedback bits and the second set of feedback bits to a second set of uplink symbols based on the identifying and on a deferment scheme, and transmit the first set of feedback bits and the second set of feedback bits to the network entity in accordance with the deferment scheme.

In some examples of the method, apparatuses, and non-transitory computer-readable medium described herein, transmitting the first set of feedback bits and the second set of feedback bits may include operations, features, means, or instructions for deferring, according to the deferment scheme, transmission of the first set of feedback bits and the second set of feedback bits in the first set of uplink symbols and transmitting, according to the deferment scheme, the first set of feedback bits and the second set of feedback bits in the second set of uplink symbols.

In some examples of the method, apparatuses, and non-transitory computer-readable medium described herein, transmitting the first set of feedback bits and the second set of feedback bits may include operations, features, means, or instructions for transmitting, according to the deferment scheme, the first set of feedback bits in the first set of uplink symbols, deferring, according to the deferment scheme, transmission of the second set of feedback bits in the first set of uplink symbols, and transmitting, according to the deferment scheme, the second set of feedback bits in the second set of uplink symbols.

Some examples of the method, apparatuses, and non-transitory computer-readable medium described herein may further include operations, features, means, or instructions for identifying a preparation time associated with generating a feedback codebook that includes only one of the first set of feedback bits or the second set of feedback bits, where the deferment scheme may be based on the preparation time.

Some examples of the method, apparatuses, and non-transitory computer-readable medium described herein may further include operations, features, means, or instructions for identifying an expiration time for transmission of the first set of feedback bits, the second set of feedback bits, or both, where the deferment scheme may be based on the expiration time.

Some examples of the method, apparatuses, and non-transitory computer-readable medium described herein may further include operations, features, means, or instructions for identifying a third set of feedback bits scheduled to be transmitted to the network entity in the second set of uplink symbols, where the deferment scheme may be based on whether the second set of uplink symbols may be within a threshold time window and may be sufficient for transmission of all of the first set of feedback bits, the second set of feedback bits, and the third set of feedback bits.

In some examples of the method, apparatuses, and non-transitory computer-readable medium described herein, the deferment scheme may be based on whether the second set of uplink symbols may be within a threshold time window and sufficient for transmission of all of the first set of feedback bits and the second set of feedback bits.

Some examples of the method, apparatuses, and non-transitory computer-readable medium described herein may further include operations, features, means, or instructions for receiving DCI from the network entity indicating the deferment scheme.

Some examples of the method, apparatuses, and non-transitory computer-readable medium described herein may further include operations, features, means, or instructions for receiving RRC signaling configuring the deferment scheme in conjunction with at least one of the first SPS configuration or the second SPS configuration.

Some examples of the method, apparatuses, and non-transitory computer-readable medium described herein may further include operations, features, means, or instructions for receiving DCI from the network entity indicating an updated deferment scheme that overrides the RRC signaling configuring the deferment scheme used for transmitting the first set of feedback bits and the second set of feedback bits.

Some examples of the method, apparatuses, and non-transitory computer-readable medium described herein may further include operations, features, means, or instructions for receiving the deferment scheme on a per-SPS configuration basis.

A method for wireless communication at a network entity is described. The method may include transmitting, to a UE, a first set of downlink transmissions in accordance with a first SPS configuration and a second set of downlink transmissions in accordance with a second SPS configuration, the first set of downlink transmissions associated with a first set of feedback bits and the second set of downlink transmissions associated with a second set of feedback bits, both the first set of feedback bits and the second set of feedback bits scheduled for transmission to the network entity in a first set of uplink symbols, identifying, based on a change in a format associated with the first set of uplink symbols, that only a subset of the first set of uplink symbols is available for transmission of the first set of feedback bits and the second set of feedback bits, determining that the UE is to defer transmission of one of the first set of feedback bits or the second set of feedback bits or both of the first set of feedback bits and the second set of feedback bits to a second set of uplink symbols based on the identifying and on a deferment scheme, and monitoring for the first set of feedback bits and the second set of feedback bits in accordance with the deferment scheme.

An apparatus for wireless communication at a network entity is described. The apparatus may include at least one processor, and memory coupled (e.g., operatively, communicatively, functionally, electronically, or electrically) with the at least one processor, the memory storing instructions executable by the at least one processor to cause the apparatus to transmit, to a UE, a first set of downlink transmissions in accordance with a first SPS configuration and a second set of downlink transmissions in accordance with a second SPS configuration, the first set of downlink transmissions associated with a first set of feedback bits and the second set of downlink transmissions associated with a second set of feedback bits, both the first set of feedback bits and the second set of feedback bits scheduled for transmission to the network entity in a first set of uplink symbols, identify, based on a change in a format associated with the first set of uplink symbols, that only a subset of the first set of uplink symbols is available for transmission of the first set of feedback bits and the second set of feedback bits, determine that the UE is to defer transmission of one of the first set of feedback bits or the second set of feedback bits or both of the first set of feedback bits and the second set of feedback bits to a second set of uplink symbols based on the identifying and on a deferment scheme, and monitor for the first set of feedback bits and the second set of feedback bits in accordance with the deferment scheme.

Another apparatus for wireless communication at a network entity is described. The apparatus may include means for transmitting, to a UE, a first set of downlink transmissions in accordance with a first SPS configuration and a second set of downlink transmissions in accordance with a second SPS configuration, the first set of downlink transmissions associated with a first set of feedback bits and the second set of downlink transmissions associated with a second set of feedback bits, both the first set of feedback bits and the second set of feedback bits scheduled for transmission to the network entity in a first set of uplink symbols, means for identifying, based on a change in a format associated with the first set of uplink symbols, that only a subset of the first set of uplink symbols is available for transmission of the first set of feedback bits and the second set of feedback bits, means for determining that the UE is to defer transmission of one of the first set of feedback bits or the second set of feedback bits or both of the first set of feedback bits and the second set of feedback bits to a second set of uplink symbols based on the identifying and on a deferment scheme, and means for monitoring for the first set of feedback bits and the second set of feedback bits in accordance with the deferment scheme.

A non-transitory computer-readable medium storing code for wireless communication at a network entity is described. The code may include instructions executable by at least one processor to transmit, to a UE, a first set of downlink transmissions in accordance with a first SPS configuration and a second set of downlink transmissions in accordance with a second SPS configuration, the first set of downlink transmissions associated with a first set of feedback bits and the second set of downlink transmissions associated with a second set of feedback bits, both the first set of feedback bits and the second set of feedback bits scheduled for transmission to the network entity in a first set of uplink symbols, identify, based on a change in a format associated with the first set of uplink symbols, that only a subset of the first set of uplink symbols is available for transmission of the first set of feedback bits and the second set of feedback bits, determine that the UE is to defer transmission of one of the first set of feedback bits or the second set of feedback bits or both of the first set of feedback bits and the second set of feedback bits to a second set of uplink symbols based on the identifying and on a deferment scheme, and monitor for the first set of feedback bits and the second set of feedback bits in accordance with the deferment scheme.

Some examples of the method, apparatuses, and non-transitory computer-readable medium described herein may further include operations, features, means, or instructions for receiving, according to the deferment scheme, the first set of feedback bits and the second set of feedback bits in the second set of uplink symbols, where the deferment scheme includes deferral of the first set of feedback bits and the second set of feedback bits from the first set of uplink symbols.

Some examples of the method, apparatuses, and non-transitory computer-readable medium described herein may further include operations, features, means, or instructions for receiving, according to the deferment scheme, the first set of feedback bits in the first set of uplink symbols and receiving, according to the deferment scheme, the second set of feedback bits in the second set of uplink symbols, where the deferment scheme includes deferral of only the first set of feedback bits from the first set of uplink symbols.

Some examples of the method, apparatuses, and non-transitory computer-readable medium described herein may further include operations, features, means, or instructions for identifying a preparation time associated with the UE generating a feedback codebook that includes only one of the first set of feedback bits or the second set of feedback bits, where the deferment scheme may be based on the preparation time.

Some examples of the method, apparatuses, and non-transitory computer-readable medium described herein may further include operations, features, means, or instructions for identifying an expiration time for receipt of the first set of feedback bits, the second set of feedback bits, or both, where the deferment scheme may be based on the expiration time.

Some examples of the method, apparatuses, and non-transitory computer-readable medium described herein may further include operations, features, means, or instructions for identifying a third set of feedback bits scheduled to be received from the UE in the second set of uplink symbols, where the deferment scheme may be based on whether the second set of uplink symbols may be within a threshold time window and may be sufficient for transmission of all of the first set of feedback bits, the second set of feedback bits, and the third set of feedback bits.

In some examples of the method, apparatuses, and non-transitory computer-readable medium described herein, the deferment scheme may be based on whether the second set of uplink symbols may be within a threshold time window and sufficient for transmission of all of the first set of feedback bits and the second set of feedback bits.

Some examples of the method, apparatuses, and non-transitory computer-readable medium described herein may further include operations, features, means, or instructions for transmitting DCI to the UE indicating the deferment scheme.

Some examples of the method, apparatuses, and non-transitory computer-readable medium described herein may further include operations, features, means, or instructions for transmitting RRC signaling configuring the deferment scheme in conjunction with at least one of the first SPS configuration or the second SPS configuration.

Some examples of the method, apparatuses, and non-transitory computer-readable medium described herein may further include operations, features, means, or instructions for transmitting DCI to the UE indicating an updated deferment scheme that overrides the RRC signaling configuring the deferment scheme used for transmitting the first set of feedback bits and the second set of feedback bits.

Some examples of the method, apparatuses, and non-transitory computer-readable medium described herein may further include operations, features, means, or instructions for transmitting the deferment scheme on a per-SPS configuration basis.

BRIEF DESCRIPTION OF THE DRAWINGS

FIG. 3 illustrates an example of a transmission scheme that supports strategies for deferring SPS uplink control channel transmissions in accordance with aspects of the present disclosure.

FIG. 4 illustrates an example of a transmission scheme that supports strategies for deferring SPS uplink control channel transmissions in accordance with aspects of the present disclosure.

FIGS. 14 through 18 show flowcharts illustrating methods that support strategies for deferring SPS uplink control channel transmissions in accordance with aspects of the present disclosure.

DETAILED DESCRIPTION

Figure 1:
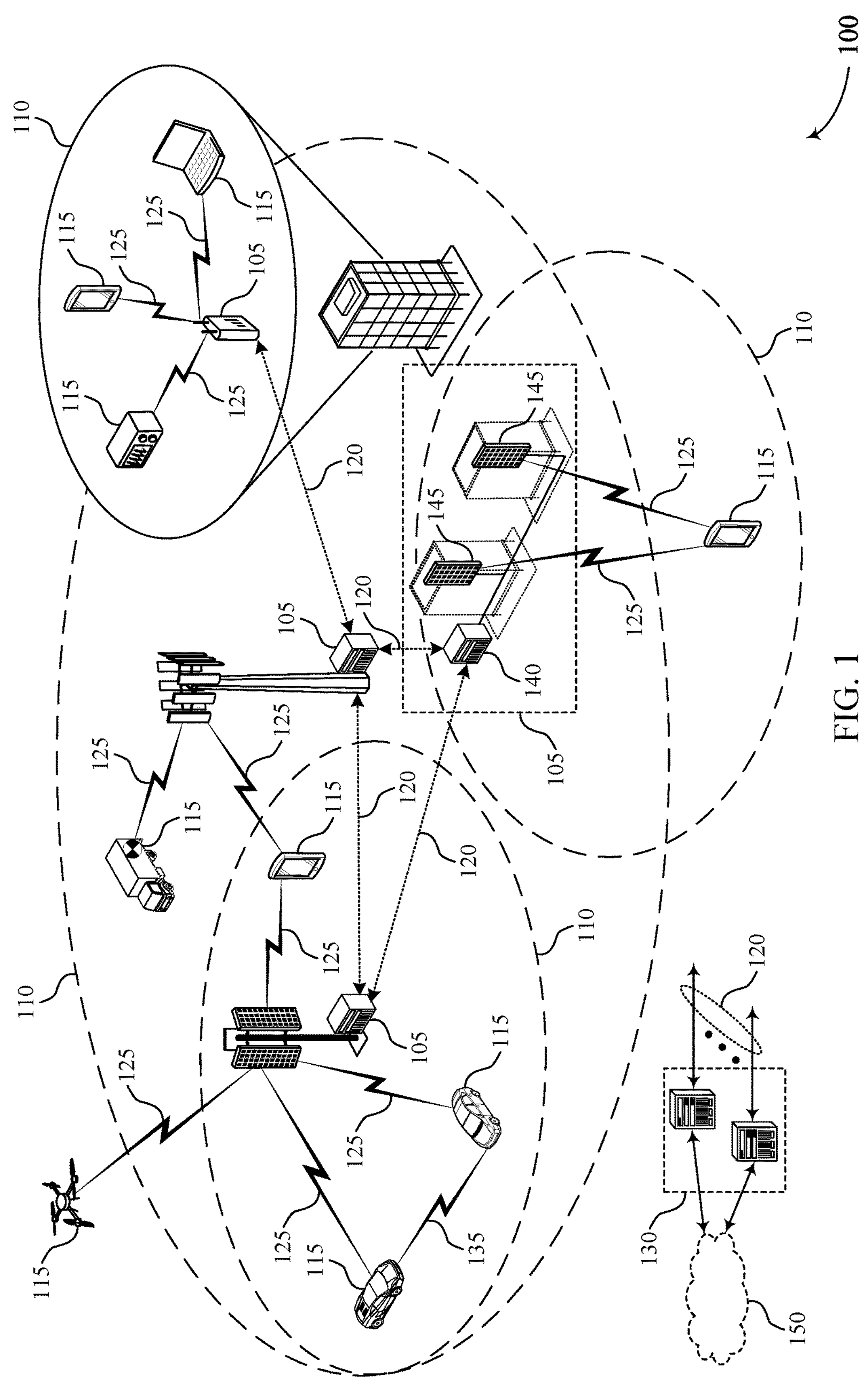
FIG. 1 illustrates an example of a wireless communications system that supports strategies for deferring semi-persistent scheduling (SPS) uplink control channel transmissions in accordance with aspects of the present disclosure.

In some wireless communications systems, a user equipment (UE) may be configured to monitor for semi-persistent scheduling (SPS) transmissions from a network entity. For example, the network entity may configure the UE with multiple SPS configurations, which may then be activated by downlink control information (DCI). The UE may transmit feedback bits (e.g., hybrid automatic repeat request (HARQ) acknowledgment (ACK) or negative ACK (NACK)) associated with the SPS transmissions (physical downlink shared channel (PDSCH) transmissions of the SPS configurations) using a physical uplink control channel (PUCCH) according to an SPS configuration. Although the techniques herein are described in the context of SPS HARQ ACK/NACK bits, it is to be understood that the techniques may also be applicable to transmission of other feedback bits, such as channel state information (CSI), other uplink control information (UCI), scheduling request, buffer status report, and other information conveyed via PUCCH and/or PUSCH.

In some cases, the format of the first set of uplink symbols scheduled to convey the feedback bits may change (e.g., due to various factors, such as changes in uplink traffic vs downlink traffic). For example, the first set of uplink symbols may be part of a slot that has been formatted in accordance with a slot format. If the slot format has been updated, the symbols within slots may also change. What was once an uplink symbol may be changed to be a downlink symbol. Alternatively, an uplink symbol could be changed to be a flexible symbol, which could then be designated for downlink traffic. In either case, the change in slot format may result in at least some of the first set of uplink symbols no longer being available for uplink transmissions. In other words, such changes may reduce the capacity or availability of the first set of uplink symbols for uplink transmission. The reduced number of uplink symbols within the first set may fail to provide sufficient resources to carry or otherwise convey all of the feedback bits originally scheduled during the first set of uplink symbols.

Generally, the described techniques provide for enabling a UE to apply a deferment scheme for transmitting or deferring some or all of the UCI feedback bits when a change in the slot format results in the uplink symbols scheduled to transmit the UCI feedback bits no longer being able to carry all of the UCI bits. A UE may monitor for multiple SPS transmissions from a network entity (e.g., downlink transmissions according to a first SPS configuration and according to a second SPS configuration). Based on the monitoring, the UE may generate SPS feedback bits (e.g., ACK or NACK bits) scheduled for transmission to the network entity in a first set of uplink symbols. The UE may identify or otherwise determine that the format in the uplink symbols originally scheduled to carry the UCI feedback bits (e.g., the first set of uplink symbols) has changed such that only a subset of the uplink symbols originally scheduled are still available. Accordingly, the UE may identify or otherwise apply a deferment scheme in combination with the available subset of uplink symbols to determine whether to defer some or all of the UCI feedback bits (e.g., a first set of feedback bits and/or a second set of feedback bits) to other uplink symbols (e.g., a second set of uplink symbols). The deferment scheme may be autonomously identified and applied by the UE or may be configured for the UE by the network entity. Accordingly, the UE may transmit or otherwise provide the UCI feedback bits (e.g., the first and second sets of feedback bits) to the network entity according to the deferment scheme. For example, the UE may defer both sets (e.g., all) of the UCI feedback bits to the second set of uplink symbols or may transmit one set (e.g., some) of the UCI feedback bits in the first set of uplink symbols and defer the other UCI feedback bits to the second set of uplink symbols. In some cases, the second set of uplink symbols may already carry existing, non-deferred UCI bits to be transmitted, and the UE may make the deferment determination based on whether the UE can multiplex the deferred SPS feedback bits and the non-deferred UCI bits in the second set of uplink symbols.

Particular aspects of the subject matter described herein may be implemented to realize one or more advantages. The described techniques may support improvements in UCI transmissions by reducing signaling overhead and power usage. By deferring some SPS feedback based on the deferment scheme, improving HARQ-ACK efficiency, and prioritizing transmissions based on uplink symbol availability, the UE may utilize available resources more efficiently and improve user experience. As such, supported techniques may include improved network operations and, in some examples, may promote network efficiencies, among other benefits.

Aspects of the disclosure are initially described in the context of wireless communications systems. Aspects of the disclosure are further illustrated by and described with reference to apparatus diagrams, system diagrams, and flowcharts that relate to strategies for deferring SPS uplink control channel transmissions.

FIG. 1 illustrates an example of a wireless communications system 100 that supports strategies for deferring SPS uplink control channel transmissions in accordance with aspects of the present disclosure. The wireless communications system 100 may include one or more network entities 105 (e.g., base station(s)), one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The network entities 105 may be dispersed throughout a geographic area to form the wireless communications system 100 and may be devices in different forms or having different capabilities. The network entities 105 and the UEs 115 may wirelessly communicate via one or more communication links 125. Each network entity 105 may provide a coverage area 110 over which the UEs 115 and the network entity 105 may establish one or more communication links 125. The coverage area 110 may be an example of a geographic area over which a network entity 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the network entities 105, or network equipment (e.g., core network nodes, relay devices, integrated access and backhaul (IAB) nodes, or other network equipment), as shown in FIG. 1.

The network entities 105 may communicate with the core network 130, or with one another, or both. For example, the network entities 105 may interface with the core network 130 through one or more backhaul links 120 (e.g., via an S1, N2, N3, or other interface). The network entities 105 may communicate with one another over the backhaul links 120 (e.g., via an X2, Xn, or other interface) either directly (e.g., directly between network entities 105), or indirectly (e.g., via core network 130), or both. In some examples, the backhaul links 120 may be or include one or more wireless links.

One or more of the network entities 105 described herein may include or may be referred to by a person having ordinary skill in the art as a base transceiver station, a radio network entity, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the “device” may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay network entities, among other examples, as shown in FIG. 1.

The UEs 115 and the network entities 105 may wirelessly communicate with one another via one or more communication links 125 over one or more carriers. The term “carrier” may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a network entity 105, or downlink transmissions from a network entity 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a “system bandwidth” of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 may be movable and therefore provide communication coverage for a moving geographic coverage area 110. In some examples, different geographic coverage areas 110 associated with different technologies may overlap, but the different geographic coverage areas 110 may be supported by the same network entity 105. In other examples, the overlapping geographic coverage areas 110 associated with different technologies may be supported by different network entities 105. The wireless communications system 100 may include, for example, a heterogeneous network in which different types of the network entities 105 provide coverage for various geographic coverage areas 110 using the same or different radio access technologies.

The wireless communications system 100 may support synchronous or asynchronous operation. For synchronous operation, the network entities 105 may have similar frame timings, and transmissions from different network entities 105 may be approximately aligned in time. For asynchronous operation, the network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a network entity 105. Other UEs 115 in such a group may be outside the geographic coverage area 110 of a network entity 105 or be otherwise unable to receive transmissions from a network entity 105. In some examples, groups of the UEs 115 communicating via D2D communications may utilize a one-to-many (1:M) system in which each UE 115 transmits to every other UE 115 in the group. In some examples, a network entity 105 facilitates the scheduling of resources for D2D communications. In other cases, D2D communications are carried out between the UEs 115 without the involvement of a network entity 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a network entity 105, may include subcomponents such as an access network entity 140, which may be an example of an access node controller (ANC) or base station. Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or network entity 105 may be distributed across various network devices (e.g., radio heads and ANCs) or consolidated into a single network device (e.g., a network entity 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station or network entity antennas or antenna arrays may be co-located at an antenna assembly, such as an antenna tower. In some examples, antennas or antenna arrays associated with a network entity 105 may be located in diverse geographic locations. A network entity 105 may have an antenna array with a number of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beam forming operations. For example, a network entity 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times in different directions. For example, the network entity 105 may transmit a signal according to different beamforming weight sets associated with different directions of transmission. Transmissions in different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a network entity 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the network entity 105 in different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or radio frequency beamforming to generate a combined beam for transmission (e.g., from a network entity 105 to a UE 115). The UE 115 may report feedback that indicates precoding weights for one or more beam directions, and the feedback may correspond to a configured number of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a network entity 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the network entity 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a network entity 105 or a core network 130 supporting radio bearers for user plane data. At the physical layer, transport channels may be mapped to physical channels.

The UEs 115 and the network entities 105 may support retransmissions of data to increase the likelihood that data is received successfully. Hybrid automatic repeat request (HARM) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval. Components within a wireless communication system may be coupled (for example, operatively, communicatively, functionally, electronically, and/or electrically) to each other.

A UE 115 may generate a first set of feedback bits associated with a first set of downlink transmissions of a first SPS configuration and a second set of feedback bits associated with a second set of downlink transmissions of a second SPS configuration, both the first set of feedback bits and the second set of feedback bits scheduled for transmission to a network entity 105 in a first set of uplink symbols. The UE 115 may identify, based at least in part on a change in a format associated with the first set of uplink symbols, that only a subset of the first set of uplink symbols is available for transmission of the first set of feedback bits and the second set of feedback bits. The UE 115 may determine to defer transmission of one or both of the first set of feedback bits or the second set of feedback bits to a second set of uplink symbols based at least in part on availability of the subset of the first set of uplink symbols and on a deferment scheme. The UE 115 may transmit the first set of feedback bits and the second set of feedback bits to the network entity 105 in accordance with the deferment scheme.

A network entity 105 may transmit, to a UE 115, a first set of downlink transmissions in accordance with a first SPS configuration and a second set of downlink transmissions in accordance with a second SPS configuration, the first set of downlink transmissions associated with a first set of feedback bits and the second set of downlink transmissions associated with a second set of feedback bits, both the first set of feedback bits and the second set of feedback bits scheduled for transmission to the network entity in a first set of uplink symbols. The network entity 105 may identify, based at least in part on a change in a format associated with the first set of uplink symbols, that only a subset of the first set of uplink symbols is available for transmission of the first set of feedback bits and the second set of feedback bits. The network entity 105 may determine that the UE 115 is to defer transmission of one or both of the first set of feedback bits or the second set of feedback bits to a second set of uplink symbols based at least in part on availability of the subset of the first set of uplink symbols and on a deferment scheme. The network entity 105 may monitor for the first set of feedback bits and the second set of feedback bits in accordance with the deferment scheme.

Figure 2:
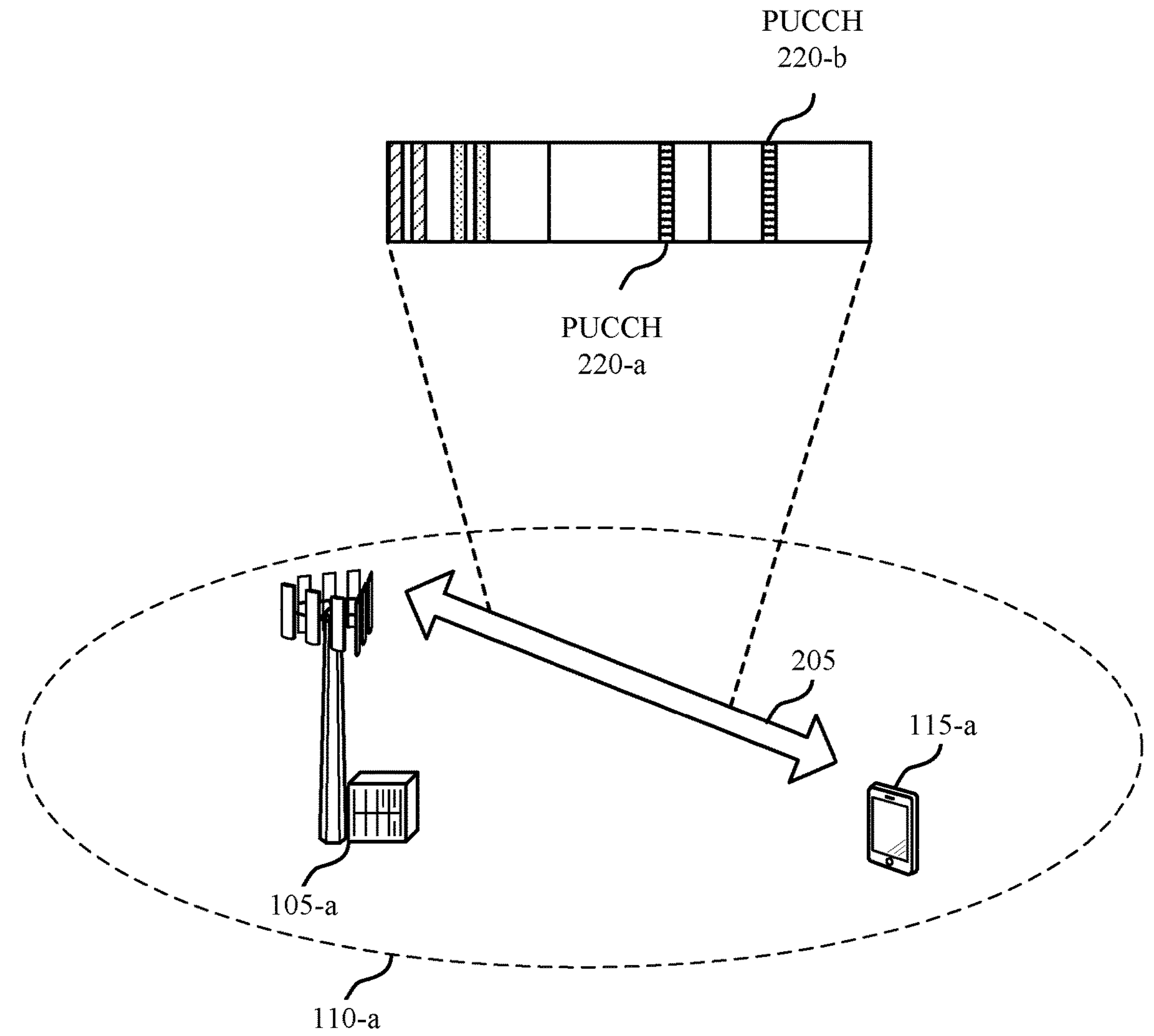
FIG. 2 illustrates an example of a wireless communications system that supports strategies for deferring SPS uplink control channel transmissions in accordance with aspects of the present disclosure.

FIG. 2 illustrates an example of a wireless communications system 200 that supports strategies for deferring SPS uplink control channel transmissions in accordance with aspects of the present disclosure. In some examples, the wireless communications system 200 may implement aspects of the wireless communications system 100 or may be implemented by aspects of the wireless communications system 100. For example, the wireless communications system 200 may include a network entity 105-*a* and a UE 115-*a*, which may be examples of corresponding devices described herein with reference to FIG. 1.

In some examples, the network entity 105-*a* and the UE 115-*a* may communicate via a communications link 205 within a coverage area 110-*a* of the network entity 105-*a*. The communications may include uplink communications (e.g., uplink transmissions from UE 115-*a* to network entity 105-*a*) and/or downlink communications (e.g., downlink transmissions from network entity 105-*a* to UE 115-*a*). The downlink communications may include dynamically configured and triggered and/or semi-statically configured and activated downlink resources. For example, the network entity 105-*a* may transmit RRC signaling configuring UE 115-*a* with one or more SPS configurations. Broadly, each SPS configuration may identify or otherwise configure resources (e.g., time resources, frequency resources, spatial resources, and/or code resources) as well as other parameters (e.g., periodicity, MCS, or any other SPS configuration parameter) to be used for the semi-persistent downlink communications. The semi-persistent downlink communications may then be triggered by an activating DCI identifying one or more SPS configurations being activated for downlink transmissions.

The UE 115-*a* may monitor for SPS transmissions (e.g., from the network entity 105-*a*), for example in PDSCH 210 and PDSCH 215, according to one or more SPS configurations (such as a first SPS configuration, SPS1, and a second SPS configuration, SPS2). Based on the monitoring, the UE 115-*a* may generate SPS feedback bits (e.g., ACK/NACK bits) scheduled for transmission to the network entity 105-*a* in a first set of uplink symbols (e.g., such as PUCCH 220-*a*). The first set of uplink signals (e.g., PUCCH 220-*a*) may be based on a duration of K1 symbols, which may separate a PDSCH and a corresponding PUCCH 220-*a*.

Accordingly, the UE 115-*a* may be configured with multiple SPS configurations, in which one or more of the SPS configurations may be activated at any given time for use in downlink transmissions. As each SPS configuration may have a corresponding periodicity factor, repetition factor, and other parameters, this may result in downlink transmissions from the network entity 105-*a* to the UE 115-*a* (e.g., PDSCH 210 using the first SPS configuration and PDSCH 215 using the second SPS configuration). In the non-limiting example illustrated in FIG. 2, the first SPS configuration may include two symbols used for PDSCH 210, with a K1 value corresponding to 20 symbols, and the second SPS configuration may include two symbols used for PDSCH 215, also with a K1 value of 20 symbols. PDSCH 210 and PDSCH 215 may also be configured for HARQ feedback signaling in a first set of uplink symbols, such as PUCCH 220-*a*. In some examples, PUCCH 220-*a* may be configured with, at least initially, two symbols that are scheduled to be used for the HARQ feedback, which may be sufficient for communicating the HARQ feedback.

Accordingly, the UE 115-*a* may monitor for the downlink transmissions from the network entity 105-*a*. For example, the UE 115-*a* may monitor for PDSCH 210 according to the first SPS configuration and monitor for PDSCH 215 according to the second SPS configuration. Based on the monitoring (e.g., depending on whether the UE 115-*a* is able to successfully receive and decode each downlink transmission), UE 115-*a* may generate a codebook to convey HARQ feedback to the network entity 105-*a* for each downlink transmission. For example, the UE 115-*a* may generate a first set of feedback bits (e.g., HARQ carried in UCI) associated with the first set of downlink transmissions (e.g., PDSCH 210 spread across two symbols) of the first SPS configuration. The UE 115-*a* may also generate a second set of feedback bits associated with the second set of downlink transmissions (e.g., PDSCH 215 spread across two symbols) of the second SPS configuration. As discussed, both the first and second sets of feedback bits may be scheduled for transmission to the network entity 105-*a* in the first set of uplink symbols corresponding to PUCCH 220-*a*. In one non-limiting example, the first set of feedback bits may include one bit associated with PDSCH 210 originally scheduled to be communicated in a first symbol of PUCCH 220-*a* and the second set of feedback bits may include one bit associated with PDSCH 215 originally scheduled to be communicated in a second symbol of PUCCH 220-*a*.

However, in some examples the format for the first set of uplink symbols (e.g., PUCCH 220-*a*) may change. For example, a slot format change may occur after activation of PDSCH 210 in PDSCH 215 such that only a subset of the first set of uplink symbols are available for transmission of the first and second sets of feedback bits. For example, the network entity 105-*a* may implement a change in the slot format impacting the first set of uplink symbols based on uplink/downlink traffic patterns, the TDD pattern of communications between the network entity 105-*a* and the UE 115-*a*, and/or other considerations. The change in the slot format may result in fewer uplink symbols being available for transmitting the first and second sets of feedback bits (e.g., the HARQ-ACK feedback). For example, at least some of the uplink symbols in the first set of uplink symbols (e.g., PUCCH 220-*a*) may be changed from uplink symbols to downlink symbols, flexible symbols, or otherwise unavailable for uplink transmissions. Accordingly, this may leave the UE 115-*a* with the first set of feedback bits and the second set of feedback bits for transmission to network entity 105-*a*, but without sufficient resources available for transmitting both sets of feedback bits in PUCCH 220-*a*.

In this situation, the UE 115-*a* must decide or otherwise determine how to provide the first and second sets of feedback bits to the network entity 105-*a*. For example, the UE 115-*a* may determine to defer transmission of one or both of the first set of feedback bits or the second set of feedback bits to a second set of uplink symbols, such as PUCCH 220-*b*. In some aspects, this may be based on the availability of the subset of the first set of uplink symbols (e.g., how many uplink symbols are still available for uplink transmission in PUCCH 220-*a* after the format change) as well as a deferment scheme. Accordingly, the UE 115-*a* may transmit or otherwise provide the first set of feedback bits and the second set of feedback bits to the network entity 105-*a* according to the deferment scheme.

In some aspects, the deferment scheme may be autonomously identified and applied by the UE 115-*a*. In other examples, the deferment scheme may be signaled to the UE 115-*a* from the network entity 105-*a*. In one example, this may include the deferment scheme being configured for UE 115-*a* via RRC signaling. That is, the network entity 105-*a* may transmit or otherwise provide RRC signaling to the UE 115-*a* that identifies or otherwise indicates which deferment scheme will be applied in the situation where the format of the originally scheduled first set of uplink symbols has changed such that fewer uplink symbols are now available. The RRC signaling may be dedicated RRC signaling indicating the deferment scheme and/or may be part of the RRC signaling configuring each SPS configuration (e.g., such as the first SPS configuration and the second SPS configuration). That is, in some examples the deferment scheme to be applied for downlink transmissions using SPS configurations may be configured as part of the SPS configuration.

In other examples, the deferment scheme may be signaled using DCI signaling. For example, a separate DCI may be communicated to the UE 115-*a* that identifies or otherwise determines the deferment scheme to be applied when the slot format is changed. In another example, the DCI activating one or more SPS configurations may carry or otherwise convey an indication of the deferment scheme.

In some examples, the DCI may be used to indicate a deferment scheme that overrides an RRC configured deferment scheme. For example, the deferment scheme to be applied for downlink transmissions may initially be RRC configured for the UE 115-*a*. However, due to a change in the slot format for the first set of uplink symbols, the network entity 105-*a* may transmit a DCI (e.g., a separate DCI, the DCI activating the SPS configurations, or other DCI) that identifies an updated or second deferment scheme to be applied when the format of the originally scheduled set of uplink symbols has changed such that fewer symbols are now available, and are insufficient to transmit both the first set of feedback bits and the second set of feedback bits.

One solution that may be applied according to the deferment scheme (e.g., a first solution) may include the UE 115-*a* deferring transmission of the first and second sets of feedback bits in the first set of uplink symbols (e.g., PUCCH 220-*a*) and, instead, transmitting the first and second sets of feedback bits in the second set of uplink symbols (e.g., PUCCH 220-*b*). Another solution that may be applied according to the deferment scheme (e.g., a second solution) may include the UE 115-*a* transmitting the first set of feedback bits (or the second set of feedback bits) in the first set of uplink symbols (e.g., PUCCH 220-*a*), deferring transmission of the second set of feedback bits (or the first set of feedback bits) in the first set of uplink symbols and, instead, transmitting the second set of feedback bits in the second set of uplink symbols (e.g., PUCCH 220-*b*).

Accordingly, the first solution may include, when only one uplink PUCCH symbol is available in the first set of uplink symbols (e.g., the subset of the first set of uplink symbols includes one symbol) which is insufficient to transmit or otherwise convey the one bit of the first set of feedback bits and the one bit of the second set of feedback bits, the UE 115-*a* may defer the two bits UCI to the first available PUCCH 220 (e.g., PUCCH 220-*b* in this example). The second solution may include, when only one uplink PUCCH 220-*a* symbol resource is available, UE 115-*a* may segment the HARQ codebook and transmit one bit out of the two HARQ bits and defer the other HARQ bit.

In some aspects, the deferment scheme may be based on various factors, which may be considered alone or in any combination. Examples of factors include, but are not limited to, the time it takes UE 115-*a* to segment/prepare a codebook to convey the feedback bits, the expiration time for the packets in the downlink transmissions, the capacity of available resources in the first and/or second set(s) of uplink symbols, other feedback bits already scheduled in the second set of uplink symbols, and/or other factors.

One example factor may include the UE 115-*a* identifying or otherwise determining the preparation time associated with segmenting a codebook and/or generating a feedback codebook including the first and/or second set of feedback bits. That is, either solution discussed above may include the UE 115-*a* generating a different codebook to convey feedback bits associated with PDSCH 210, PDSCH 215, as well as any feedback bits originally scheduled to be conveyed in the second set of uplink symbols. Accordingly, the deferment scheme selected and applied in response to a change in the slot format for the first set of uplink symbols may depend on when the second set of uplink symbols (e.g., PUCCH 220-*b*) are scheduled. Accordingly, the UE 115-*a* may identify or otherwise determine whether there is sufficient time to segment/prepare or otherwise generating the new codebook(s) (e.g., K1_def<K1_def_min) when determining whether the deferment scheme applies solution one (e.g., defer both sets if feedback bits) or solution two (transmit one set, defer other set(s) of feedback bits). In some non-limiting examples, the deferment scheme may include applying solution one if there is not sufficient time to prepare the new codebook or solution two if there is sufficient time to prepare the new codebook.

Another example may include UE 115-*a* identifying or otherwise determining an expiration time for transmission of the first and/or second sets of feedback bits. That is, each downlink transmission (e.g., PDSCH 210 and/or PDSCH 215) may be configured such that the UCI bits (e.g., HARQ bits in the first and second sets of feedback bits) expire at a certain point in time. When the UCI bits (e.g., the feedback bits) expire, the network entity 105-*a* may identify or otherwise determine that the downlink transmission was unsuccessful and therefore schedule a retransmission. Accordingly, providing the UCI bits prior to the expiration time may reduce unnecessary retransmissions and conserve wireless resources. Accordingly, the UE 115-*a* may identify or otherwise determine, for each set of feedback bits, whether deferring during the first set of uplink symbols (e.g., PUCCH 220-*a*) to the second set of uplink symbols (e.g., PUCCH 220-*b*) might result in some of the UCI bits expiring. Accordingly, the deferment scheme selected or otherwise applied when the change in format for the first set of uplink symbols reduces the capacity may be based on whether the feedback bits in the first set of feedback bits and/or second set of feedback bits expire prior to the scheduled second set of uplink symbols (e.g., PUCCH 220-*b*). In some non-limiting examples, the deferment scheme may include applying solution one if the UCI bits of the downlink packets do not expire at the current time slot or solution two if some of the HARQ bits for the downlink packets expire at the current time slot. The current time slot in this example may refer to the slot boundary between slots including the first set of uplink symbols and the second set of uplink symbols.

Another example may include the UE 115-*a* identifying or otherwise determining whether the resources (e.g., such as the number of uplink symbols) available in the second set of uplink symbols is sufficient to transmit the first set of feedback bits and the second set of feedback bits. For example, aspects of the deferment scheme may include or otherwise be based on the available resources in the second set of uplink symbols. In one non-limiting example, the UE 115-*a* may determine that the available resources in the second set of uplink symbols (e.g., PUCCH 220-*b*) are sufficient to carry all of the first and second sets of feedback bits. In the non-limiting example where the UE 115-*a* determines that the available resources in the second set of uplink symbols are sufficient to carry both the first and second sets of feedback bits, the deferment scheme may apply solution one discussed above where both the first and second sets of feedback bits are deferred to the second set of uplink symbols. In the non-limiting example where the UE 115-*a* determines that the available resources in the second set of uplink symbols are sufficient to carry only one of the first or second sets of feedback bits, the deferment scheme may apply solution two discussed above where one set of feedback bits is transmitted in the first set of uplink symbols and the other set of feedback bits are deferred for transmission in the second set of uplink symbols.

In some aspects, the available resources in the second set of uplink symbols may be based on other feedback bits scheduled to be transmitted in the second set of uplink symbols. For example, this may include the UE 115-*a* identifying or otherwise determining a third set of feedback bits scheduled to be transmitted to the network entity 105-*a* in the second set of uplink symbols. For example, the UE 115-*a* may check a candidate target slot for carrying a deferred PUCCH 220-*a* (e.g., the first and/or second sets of feedback bits). In some other cases, the candidate target slot may already be carrying existing non-deferred UCI bits for transmission, and as such, the candidate target slot may or may not have the capacity/resources available to carry the non-deferred set(s) of feedback bits plus the deferred SPS ACK/NACK bits from PUCCH 220-*a*. It may be beneficial for the UE 115-*a* to determine whether to skip the candidate target slot and check the availability of a next slot, or transmit the existing UCI bits or part of the PUCCH 220-*a* SPS ACK/NACK bits in the candidate target slot.

In some examples where some or all of the feedback bits originally scheduled in PUCCH 220-*a*, the UE 115-*a* may multiplex deferred and non-deferred UCI bits in the same slot (e.g., in the second set of uplink symbols). A new codebook in the new PUCCH 220 (e.g., PUCCH 220-*b*) may be a concatenation of the individual codebooks originally from PUCCH 220-*a*, for example based on the order in time of the PUCCHs.

As discussed above, the deferment scheme may be based on any of the factors discussed above, alone or in any combination. For example, the deferment scheme may be based on whether the second set of uplink symbols are within a threshold time window (e.g., based on expiration time), the sufficiency for transmission of feedback bits in the first and/or second sets of uplink symbols (e.g., capacity/resource availability), the preparation time for the UE 115-*a* to generate/regenerate the HARQ-ACK codebook to convey the feedback bits, and other factors.

Accordingly, in the situation where the format of the first set of uplink symbols (e.g., PUCCH 220-*a*) has changed such that the first and second sets of feedback bits can no longer be communicated, the UE 115-*a* and/or the network entity 105-*a* may configure, select, or otherwise identify a deferment scheme to apply based on any of the factors discussed above, alone or in combination. The UE 115-*a* may transmit the first set of feedback bits, second set of feedback bits, and/or third set of feedback bits to the network entity 105-*a* in the first set of uplink symbols and/or the second set of uplink symbols, depending on the solution applied according to the deferment scheme that is based on the factor(s) discussed above.

FIG. 3 illustrates an example of a transmission scheme 300 that supports strategies for deferring SPS uplink control channel transmissions in accordance with aspects of the present disclosure. In some examples, the transmission scheme 300 may implement aspects of the wireless communications systems 100 and 200 or may be implemented by aspects of the wireless communications systems 100 and 200. For example, the transmission scheme 300 may illustrate communications between a network entity 105-*b* and a UE 115-*b*, which may be examples of corresponding devices described herein with reference to FIGS. 1 and 2. In some cases, a UE 115-*b* may implement techniques for multiplexing UCI bits to determine how to transmit deferred SPS feedback in a set of uplink symbols in accordance with transmission scheme 300.

In some examples, the network entity 105-*b* and the UE 115-*b* may communicate via a communication link (e.g., communication link 205 as described with reference to FIG. 2). The UE 115-*b* may be configured to monitor for SPS transmissions from the network entity 105-*b*. For example, the network entity 105-*b* may transmit a first set of downlink transmissions (e.g., PDSCH 305-*a*) according to a first SPS configuration, which may be referred to as SPS config 1 or SPS1, and a second set of downlink transmissions (e.g., PDSCH 310-*a*) according to a second SPS configuration, which may be referred to as SPS config 2 or SPS2. In some cases, the UE 115-*b* may transmit SPS feedback (e.g., SPS ACK/NACK bits) for each of PDSCH 305-*a* and PDSCH 310-*a* via a corresponding set of uplink symbols (e.g., PUCCH 315-*a*). Accordingly, the UE 115-*b* may transmit or otherwise convey the HARQ-ACK feedback (e.g., two sets of feedback bits associated with PDSCH 305-*a* and PDSCH 310-*a*, respectively), to the network entity 105-*b*. In some aspects, the set of uplink symbols corresponding to PUCCH 315-*a* may be indicated in the RRC signaling configuring the first and/or second SPS configurations.

In some aspects, the first and/or second SPS configurations may also be used for subsequent PDSCH transmissions from the network entity 105-*b* to the UE 115-*b*. However, in some situations the format for the uplink symbols scheduled for feedback bits associated with SPS-based PDSCH transmissions may change. For example, the network entity 105-*b* may update or otherwise change the slot format for slots 320 due to changes in traffic patterns (e.g., uplink traffic patterns and/or downlink traffic patterns), to support higher priority communications in one traffic direction over the other direction, and other considerations. In some examples, the change in the slot format may correspond to only a subset of the uplink symbols being available for transmission (e.g., fewer uplink symbols are available in the scheduled PUCCH 315).

For example and after a slot format change, the network entity 105-*b* may again use the first SPS configuration to transmit a first set of downlink transmissions (e.g., PDSCH 305-*b*) and the second SPS configuration may be used to transmit a second set of downlink transmissions (e.g., PDSCH 310-*b*) to the UE 115-*b*. In response to the PDSCH transmissions, the UE 115-*b* may generate a first set of feedback bits associated with the first set of downlink transmissions (e.g., PDSCH 305-*b*) and a second set of feedback bits associated with the second set of downlink transmissions (e.g., PDSCH 310-*b*). Originally, the first set of feedback bits and the second set of feedback bits may be scheduled for transmission to the network entity 105-*b* in a first set of uplink symbols (e.g., PUCCH 315-*b*). However, due to the change in the format associated with the first set of uplink symbols, the UE 115-*b* may identify or otherwise determine that only a subset of the uplink symbols in the first set of uplink symbols are available for transmission of the first and second sets of feedback bits. That is, fewer uplink symbols may be available in PUCCH 315-*b* than was originally scheduled to convey the first and second sets of feedback bits due to the slot format change. In one non-limiting example, this may include the first set of uplink symbols originally using a slot format 31, which includes 11 downlink symbols, one flexible symbol, and two uplink symbols (with the two uplink symbols being the first set of uplink symbols). The change in format may include changing to a slot format 28, which includes 12 downlink symbols, one flexible symbol, and only one uplink symbol (with the one uplink symbol forming a subset of the first set of uplink symbols). Accordingly, fewer uplink symbols may be available in the first set of uplink symbols (e.g., PUCCH 315-*b*) such that only a subset of the first set of uplink symbols are available, which may be insufficient to carry or otherwise convey both the first set and the second set of feedback bits.

In this situation, UE 115-*b* and/or network entity 105-*b* may determine whether to defer transmission of one or both of the first set of feedback bits or the second set of feedback bits to a second set of uplink symbols (e.g., PUCCH 315-*c*). In some aspects, this may be based on the availability of the uplink symbols in the second set of uplink symbols (e.g., are there uplink symbols available in the second set of uplink symbols to carry one or both of the first and second sets of feedback bits, in addition to other feedback bits scheduled in the second set of uplink symbols), as well as a deferment scheme. As discussed above, the deferment scheme may be autonomously identified and applied by UE 115-*b* or may be identified and applied based on coordination/signaling between the network entity 105-*b* and the UE 115-*b*. For example, network entity 105-*b* may configure the deferment scheme to be applied using RRC signaling as part of the SPS configuration or as stand-alone RRC signaling. The RRC configured deferment scheme may, in some examples, be updated using a DCI transmitted from the network entity 105-*b*. In other examples, a DCI may be used to configure or otherwise indicate the deferment scheme, such as the DCI activating a particular SPS configuration and/or a separate stand-alone DCI.

Accordingly, the UE 115-*b* may transmit or otherwise provide the first set of feedback bits and the second set of feedback bits to the network entity 105-*b* in accordance with the deferment scheme. As discussed above, different solutions may be applied in the deferment scheme depending on various factors, considered alone or in any combination. For example, the deferment scheme (and solution applied based on the deferment scheme) may be based on the time it takes UE 115-*b* to generate a codebook to convey the feedback bits, the validity/expiration time associated with the feedback bits, and other factors.

Transmission scheme 300 illustrates an example where transmitting the first set of feedback bits and the second set of feedback bits according to the deferment scheme includes deferring transmission of the first set of feedback bits and the second set of feedback bits in the first set of uplink symbols (e.g., PUCCH 315-*b*) and, instead, transmitting both the first set of feedback bits in the second set of feedback bits in the second set of uplink symbols (e.g., PUCCH 315-*c*). As discussed above, this first solution may be applied in the situation where there is insufficient time for UE 115-*b* to prepare a new codebook (e.g., to segment the codebook indicating the first and second set of feedback bits into separate codebooks separately indicating the feedback bits), the UCI (e.g., HARQ) bits for the downlink packets (e.g., PDSCH 305-*b* and/or PDSCH 310-*b*) not expiring within a current time slot, and other factors. Accordingly, the deferment scheme in this example may adopt the first solution where both sets of feedback bits are deferred until the second set of uplink symbols.

FIG. 4 illustrates an example of a transmission scheme 400 that supports strategies for deferring SPS uplink control channel transmissions in accordance with aspects of the present disclosure. In some examples, the transmission scheme 400 may implement aspects of the wireless communications systems 100 and 200 or may be implemented by aspects of the wireless communications systems 100 and 200. For example, the transmission scheme 400 may illustrate communications between a network entity 105-*c* and a UE 115-*c*, which may be examples of corresponding devices described herein with reference to FIGS. 1 and 2. In some cases, a UE 115-*c* may implement techniques for multiplexing UCI bits to determine how to transmit deferred SPS feedback in a set of uplink symbols in accordance with transmission scheme 400.

In some examples, the network entity 105-*c* and the UE 115-*c* may communicate via a communication link (e.g., communication link 205 as described with reference to FIG. 2). The UE 115-*c* may be configured to monitor for SPS transmissions from the network entity 105-*c*. For example, the network entity 105-*c* may transmit a first set of downlink transmissions (e.g., PDSCH 405-*a*) according to a first SPS configuration, which may be referred to as SPS config 1 or SPS1, and a second set of downlink transmissions (e.g., PDSCH 410-*a*) according to a second SPS configuration, which may be referred to as SPS config 2 or SPS2. In some cases, the UE 115-*c* may transmit SPS feedback (e.g., SPS ACK/NACK bits) for each of PDSCH 405-*a* and PDSCH 410-*a* via a corresponding set of uplink symbols (e.g., PUCCH 415-*a*). Accordingly, the UE 115-*c* may transmit or otherwise convey the HARQ-ACK feedback (e.g., two sets of feedback bits associated with PDSCH 405-*a* and PDSCH 410-*a*, respectively), to the network entity 105-*c*. In some aspects, the set of uplink symbols corresponding to PUCCH 415-*a* may be indicated in the RRC signaling configuring the first and/or second SPS configurations.

In some aspects, the first and/or second SPS configurations may also be used for subsequent PDSCH transmissions from the network entity 105-*c* to the UE 115-*c*. However, in some situations the format for the uplink symbols scheduled for feedback bits associated with SPS-based PDSCH transmissions may change. For example, the network entity 105-*c* may update or otherwise change the slot format for slots 420 due to changes in traffic patterns (e.g., uplink traffic patterns and/or downlink traffic patterns), to support higher priority communications in one traffic direction over the other direction, and other considerations. In some examples, the change in the slot format may correspond to only a subset of the uplink symbols being available for transmission (e.g., fewer uplink symbols are available in the scheduled PUCCH 415).

For example and after a slot format change, the network entity 105-*c* may again use the first SPS configuration to transmit a first set of downlink transmissions (e.g., PDSCH 405-*b*) and the second SPS configuration may be used to transmit a second set of downlink transmissions (e.g., PDSCH 410-*b*) to the UE 115-*c*. In response to the PDSCH transmissions, the UE 115-*c* may generate a first set of feedback bits associated with the first set of downlink transmissions (e.g., PDSCH 405-*b*) and a second set of feedback bits associated with the second set of downlink transmissions (e.g., PDSCH 410-*b*). Originally, the first set of feedback bits and the second set of feedback bits may be scheduled for transmission to the network entity 105-*c* in a first set of uplink symbols (e.g., PUCCH 415-*b*). However, due to the change in the format associated with the first set of uplink symbols, the UE 115-*c* may identify or otherwise determine that only a subset of the uplink symbols in the first set of uplink symbols are available for transmission of the first and second sets of feedback bits. That is, fewer uplink symbols may be available in PUCCH 315-*c* than was originally scheduled to convey the first and second sets of feedback bits due to the slot format change. Accordingly, fewer uplink symbols may be available in the first set of uplink symbols (e.g., PUCCH 415-*b*) such that only a subset of the first set of uplink symbols are available, which may be insufficient to carry or otherwise convey both the first set and the second set of feedback bits.

In this situation, UE 115-*c* and/or network entity 105-*c* may determine whether to defer transmission of one or both of the first set of feedback bits or the second set of feedback bits to a second set of uplink symbols (e.g., PUCCH 415-*c*). In some aspects, this may be based on the availability of the uplink symbols in the second set of uplink symbols (e.g., are there uplink symbols available in the second set of uplink symbols to carry one or both of the first and second sets of feedback bits, in addition to other feedback bits scheduled in the second set of uplink symbols), as well as a deferment scheme. As discussed above, the deferment scheme may be autonomously identified and applied by UE 115-*c* or may be identified and applied based on coordination/signaling between the network entity 105-*c* and the UE 115-*c*. For example, network entity 105-*c* may configure the deferment scheme to be applied using RRC signaling as part of the SPS configuration or as stand-alone RRC signaling. The RRC configured deferment scheme may, in some examples, be updated using a DCI transmitted from the network entity 105-*c*. In other examples, a DCI may be used to configure or otherwise indicate the deferment scheme, such as the DCI activating a particular SPS configuration and/or a separate stand-alone DCI.

Accordingly, the UE 115-*c* may transmit or otherwise provide the first set of feedback bits and the second set of feedback bits to the network entity 105-*c* in accordance with the deferment scheme. As discussed above, different solutions may be applied in the deferment scheme depending on various factors, considered alone or in any combination. For example, the deferment scheme (and solution applied based on the deferment scheme) may be based on the time it takes UE 115-*c* to generate a codebook to convey the feedback bits, the validity/expiration time associated with the feedback bits, and other factors.

Transmission scheme 400 illustrates an example where transmitting the first set of feedback bits and the second set of feedback bits according to the deferment scheme includes deferring transmission of the second set of feedback bits (or the first set of feedback bits) in the first set of uplink symbols (e.g., PUCCH 415-*b*), but transmitting the first set of feedback bits in the first set of uplink symbols (e.g., PUCCH 415-*b*). This may include transmitting the deferred set of feedback bits (e.g., the second of feedback bits in this example) in the second set of uplink symbols (e.g., PUCCH 415-*c*). As discussed above, this second solution may be applied in the situation where there is sufficient time for UE 115-*c* to prepare a new codebook (e.g., to segment the codebook indicating the first and second set of feedback bits into separate codebooks separately indicating the feedback bits), the UCI (e.g., HARQ) bits for the downlink packets (e.g., PDSCH 405-*b* or PDSCH 410-*b*) expiring within a current time slot, and other factors. Accordingly, the deferment scheme in this example may adopt the second solution where some set(s) of feedback bits are deferred until the second set of uplink symbols, but other set(s) of feedback bits are still transmitted in the first set of uplink symbols.

Figure 5:
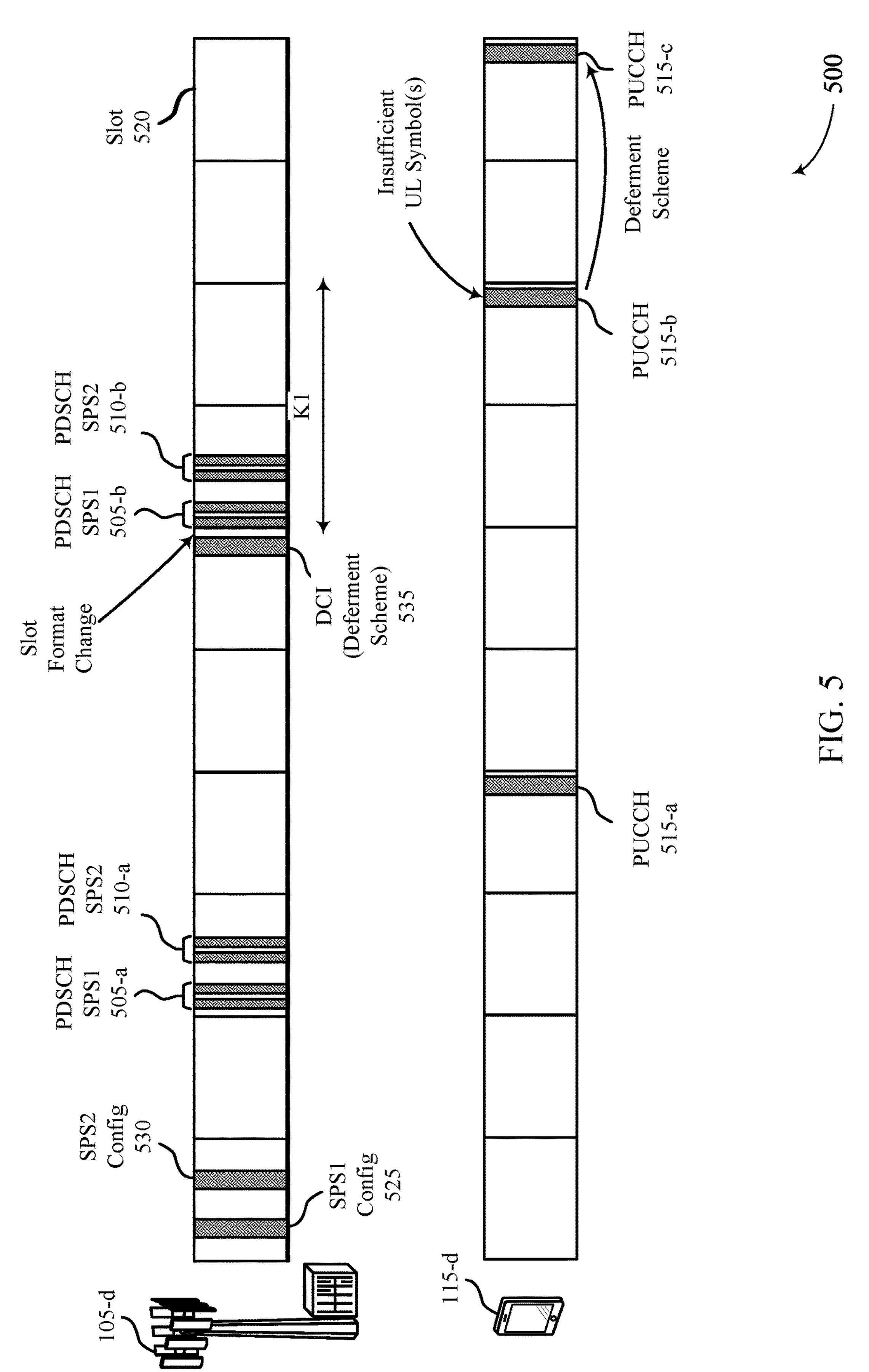
FIG. 5 illustrates an example of a transmission scheme that supports strategies for deferring SPS uplink control channel transmissions in accordance with aspects of the present disclosure.

FIG. 5 illustrates an example of a transmission scheme 500 that supports strategies for deferring SPS uplink control channel transmissions in accordance with aspects of the present disclosure. In some examples, the transmission scheme 500 may implement aspects of the wireless communications systems 100 and 200 or may be implemented by aspects of the wireless communications systems 100 and 200. For example, the transmission scheme 500 may illustrate communications between a network entity 105-*d* and a UE 115-*d*, which may be examples of corresponding devices described herein with reference to FIGS. 1 and 2. In some cases, a UE 115-*d* may implement techniques for multiplexing UCI bits to determine how to transmit deferred SPS feedback in a set of uplink symbols in accordance with transmission scheme 500.

In some examples, the network entity 105-*d* and the UE 115-*d* may communicate via a communication link (e.g., communication link 205 as described with reference to FIG. 2). The UE 115-*d* may be configured to monitor for SPS transmissions from the network entity 105-*d*. For example, the network entity 105-*d* may transmit a first SPS configuration to the UE 115-*d* (e.g., using RRC signaling 525) and a second SPS configuration to the UE 115-*d* (e.g., using RRC signaling 530). The network entity 105-*d* may transmit a first set of downlink transmissions (e.g., PDSCH 505-*a*) according to a first SPS configuration, which may be referred to as SPS config 1 or SPS1, and a second set of downlink transmissions (e.g., PDSCH 510-*a*) according to a second SPS configuration, which may be referred to as SPS config 2 or SPS2. In some cases, the UE 115-*d* may transmit SPS feedback (e.g., SPS ACK/NACK bits) for each of PDSCH 505-*a* and PDSCH 510-*a* via a corresponding set of uplink symbols (e.g., PUCCH 515-*a*). Accordingly, the UE 115-*d* may transmit or otherwise convey the HARQ-ACK feedback (e.g., two sets of feedback bits associated with PDSCH 505-*a* and PDSCH 510-*a*, respectively), to the network entity 105-*d*. In some aspects, the set of uplink symbols corresponding to PUCCH 515-*a* may be indicated in the RRC signaling configuring the first and/or second SPS configurations.

In some aspects, the first and/or second SPS configurations may also be used for subsequent PDSCH transmissions from the network entity 105-*d* to the UE 115-*d*. However, in some situations the format for the uplink symbols scheduled for feedback bits associated with SPS-based PDSCH transmissions may change. For example, the network entity 105-*d* may update or otherwise change the slot format for slots 520 due to changes in traffic patterns (e.g., uplink traffic patterns and/or downlink traffic patterns), to support higher priority communications in one traffic direction over the other direction, and other considerations. In some examples, the change in the slot format may correspond to only a subset of the uplink symbols being available for transmission (e.g., fewer uplink symbols are available in the scheduled PUCCH 515).

For example and after a slot format change, the network entity 105-*d* may again use the first SPS configuration to transmit a first set of downlink transmissions (e.g., PDSCH 505-*b*) and the second SPS configuration may be used to transmit a second set of downlink transmissions (e.g., PDSCH 510-*b*) to the UE 115-*d*. In response to the PDSCH transmissions, the UE 115-*d* may generate a first set of feedback bits associated with the first set of downlink transmissions (e.g., PDSCH 505-*b*) and a second set of feedback bits associated with the second set of downlink transmissions (e.g., PDSCH 510-*b*). Originally, the first set of feedback bits and the second set of feedback bits may be scheduled for transmission to the network entity 105-*d* in a first set of uplink symbols (e.g., PUCCH 515-*b*). However, due to the change in the format associated with the first set of uplink symbols, the UE 115-*d* may identify or otherwise determine that only a subset of the uplink symbols in the first set of uplink symbols are available for transmission of the first and second sets of feedback bits. That is, fewer uplink symbols may be available in PUCCH 515-*b* than was originally scheduled to convey the first and second sets of feedback bits due to the slot format change. Accordingly, fewer uplink symbols may be available in the first set of uplink symbols (e.g., PUCCH 515-*b*) such that only a subset of the first set of uplink symbols are available, which may be insufficient to carry or otherwise convey both the first set and the second set of feedback bits.

In this situation, UE 115-*d* and/or network entity 105-*d* may determine whether to defer transmission of one or both of the first set of feedback bits or the second set of feedback bits to a second set of uplink symbols (e.g., PUCCH 515-*c*). In some aspects, this may be based on the availability of the uplink symbols in the second set of uplink symbols (e.g., are there uplink symbols available in the second set of uplink symbols to carry one or both of the first and second sets of feedback bits, in addition to other feedback bits scheduled in the second set of uplink symbols), as well as a deferment scheme. As discussed above, the deferment scheme may be autonomously identified and applied by UE 115-*d* or may be identified and applied based on coordination/signaling between the network entity 105-*d* and the UE 115-*d*. For example, network entity 105-*d* may configure the deferment scheme to be applied using RRC signaling as part of the SPS configuration (e.g., SPS signaling 525 and/or SPS signaling 530) or as stand-alone RRC signaling. The RRC configured deferment scheme may, in some examples, be updated using a DCI 535 transmitted from the network entity 105-*d*. In other examples, the DCI 535 may be used to configure or otherwise indicate the deferment scheme, such as the DCI 535 activating a particular SPS configuration and/or a separate stand-alone DCI.

Accordingly, the UE 115-*d* may transmit or otherwise provide the first set of feedback bits and the second set of feedback bits to the network entity 105-*d* in accordance with the deferment scheme. As discussed above, different solutions may be applied in the deferment scheme depending on various factors, considered alone or in any combination. For example, the deferment scheme (and solution applied based on the deferment scheme) may be based on the time it takes UE 115-*d* to generate a codebook to convey the feedback bits, the validity/expiration time associated with the feedback bits, and other factors.

Figure 6:
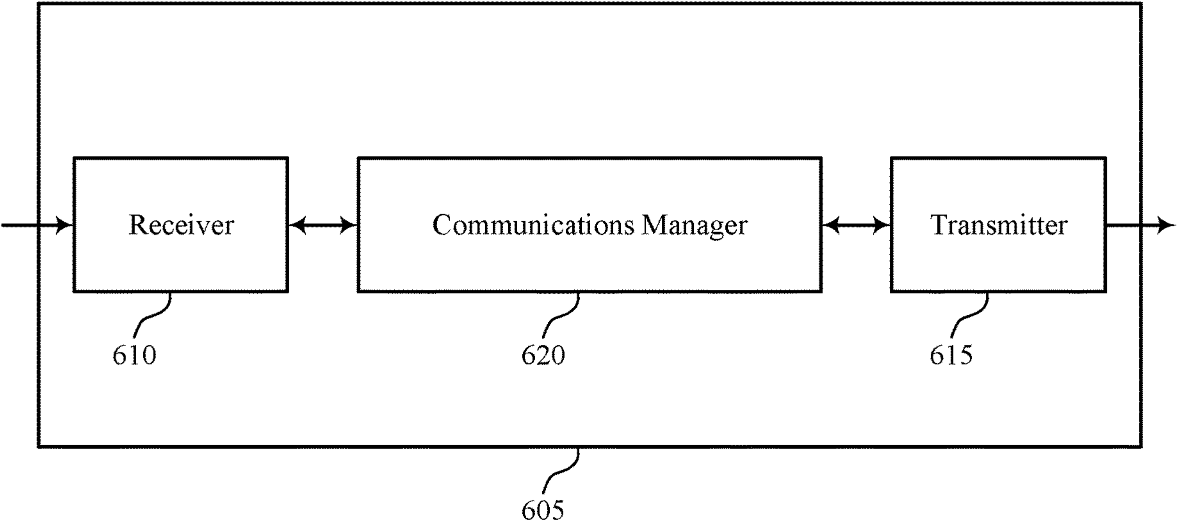
FIGS. 6 and 7 show block diagrams of devices that support strategies for deferring SPS uplink control channel transmissions in accordance with aspects of the present disclosure.

FIG. 6 shows a block diagram 600 of a device 605 that supports strategies for deferring SPS uplink control channel transmissions in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to strategies for deferring SPS uplink control channel transmissions). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to strategies for deferring SPS uplink control channel transmissions). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of strategies for deferring SPS uplink control channel transmissions as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry), software (e.g., executed by at least one processor), or any combination thereof. The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software) executed by a processor. If implemented in code executed by a processor, the functions of the communications manager 620, the receiver 610, the transmitter 615, or various combinations or components thereof may be performed by a general-purpose processor, a DSP, a central processing unit (CPU), a graphics processing unit (GPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for generating a first set of feedback bits associated with a first set of downlink transmissions of a first SPS configuration and a second set of feedback bits associated with a second set of downlink transmissions of a second SPS configuration, both the first set of feedback bits and the second set of feedback bits scheduled for transmission to a network entity in a first set of uplink symbols. The communications manager 620 may be configured as or otherwise support a means for identifying, based on a change in a format associated with the first set of uplink symbols, that only a subset of the first set of uplink symbols is available for transmission of the first set of feedback bits and the second set of feedback bits. The communications manager 620 may be configured as or otherwise support a means for determining to defer transmission of one or both of the first set of feedback bits or the second set of feedback bits to a second set of uplink symbols based on availability of the subset of the first set of uplink symbols and on a deferment scheme. The communications manager 620 may be configured as or otherwise support a means for transmitting the first set of feedback bits and the second set of feedback bits to the network entity in accordance with the deferment scheme.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for improving HARQ-ACK feedback bit transmission as UCI bits in PUCCH when a slot format change reduces the uplink symbols originally scheduled to carry or otherwise convey the HARQ-ACK feedback bits.

Figure 7:
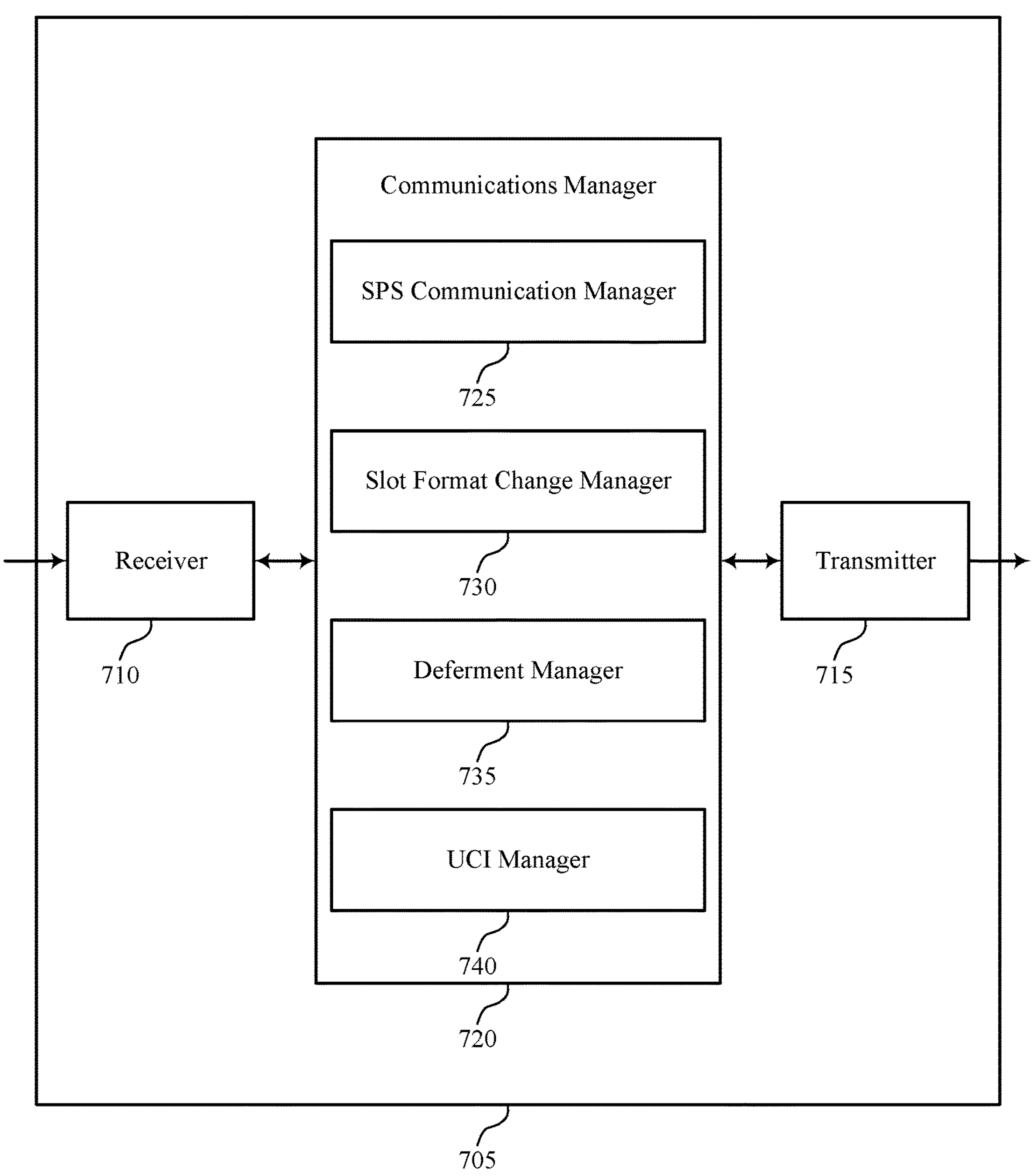

FIG. 7 shows a block diagram 700 of a device 705 that supports strategies for deferring SPS uplink control channel transmissions in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to strategies for deferring SPS uplink control channel transmissions). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to strategies for deferring SPS uplink control channel transmissions). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of strategies for deferring SPS uplink control channel transmissions as described herein. For example, the communications manager 720 may include an SPS communication manager 725, a slot format change manager 730, a deferment manager 735, a UCI manager 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The SPS communication manager 725 may be configured as or otherwise support a means for generating a first set of feedback bits associated with a first set of downlink transmissions of a first SPS configuration and a second set of feedback bits associated with a second set of downlink transmissions of a second SPS configuration, both the first set of feedback bits and the second set of feedback bits scheduled for transmission to a network entity in a first set of uplink symbols. The slot format change manager 730 may be configured as or otherwise support a means for identifying, based on a change in a format associated with the first set of uplink symbols, that only a subset of the first set of uplink symbols is available for transmission of the first set of feedback bits and the second set of feedback bits. The deferment manager 735 may be configured as or otherwise support a means for determining to defer transmission of one or both of the first set of feedback bits or the second set of feedback bits to a second set of uplink symbols based on availability of the subset of the first set of uplink symbols and on a deferment scheme. The UCI manager 740 may be configured as or otherwise support a means for transmitting the first set of feedback bits and the second set of feedback bits to the network entity in accordance with the deferment scheme.

Figure 8:
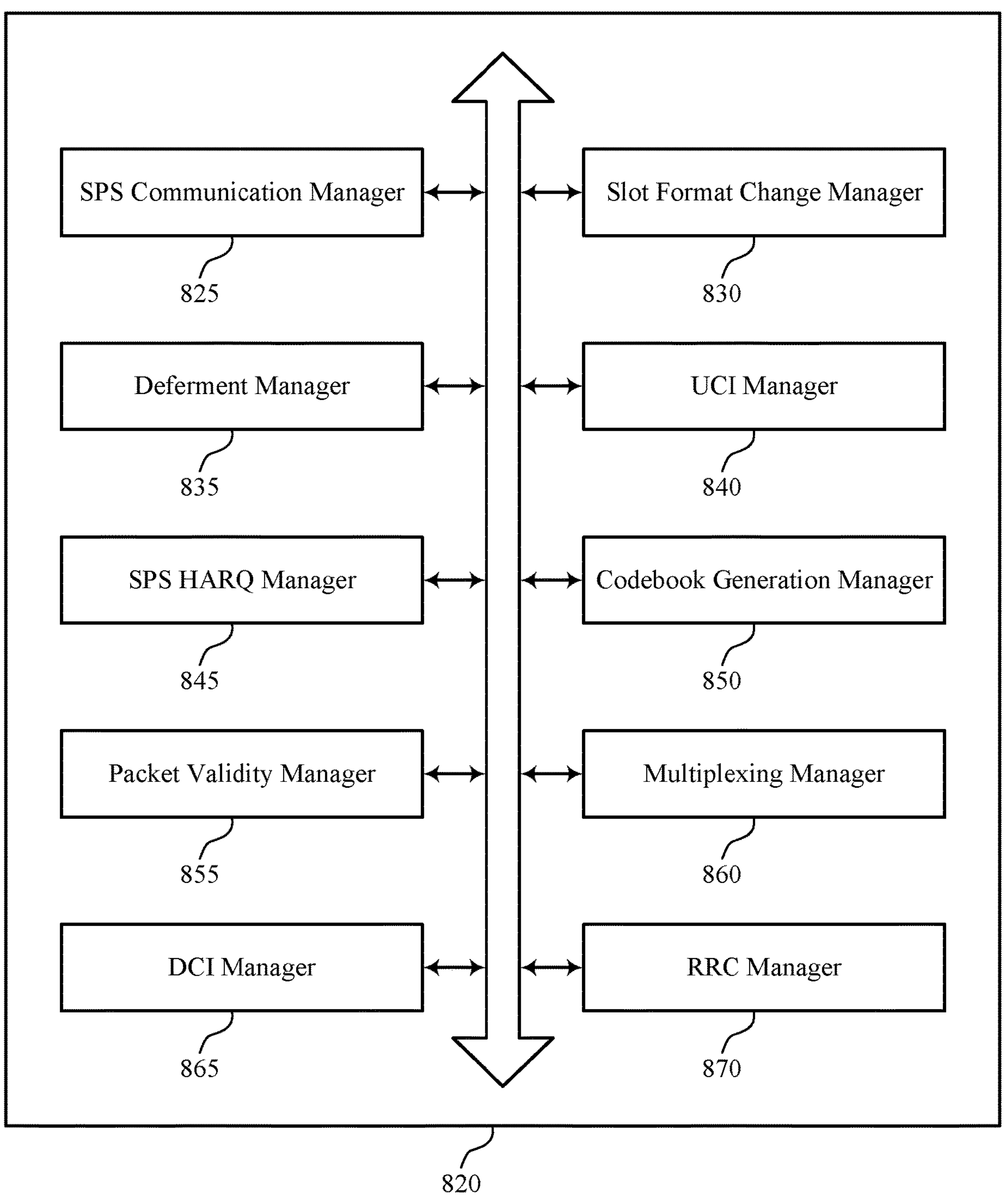
FIG. 8 shows a block diagram of a communications manager that supports strategies for deferring SPS uplink control channel transmissions in accordance with aspects of the present disclosure.

FIG. 8 shows a block diagram 800 of a communications manager 820 that supports strategies for deferring SPS uplink control channel transmissions in accordance with aspects of the present disclosure. The communications manager 820 may be an example of aspects of a communications manager 620, a communications manager 720, or both, as described herein. The communications manager 820, or various components thereof, may be an example of means for performing various aspects of strategies for deferring SPS uplink control channel transmissions as described herein. For example, the communications manager 820 may include an SPS communication manager 825, a slot format change manager 830, a deferment manager 835, a UCI manager 840, an SPS HARQ manager 845, a codebook generation manager 850, a packet validity manager 855, a multiplexing manager 860, a DCI manager 865, an RRC manager 870, or any combination thereof. Each of these components may communicate, directly or indirectly, with one another (e.g., via one or more buses).

The communications manager 820 may support wireless communication at a UE in accordance with examples as disclosed herein. The SPS communication manager 825 may be configured as or otherwise support a means for generating a first set of feedback bits associated with a first set of downlink transmissions of a first SPS configuration and a second set of feedback bits associated with a second set of downlink transmissions of a second SPS configuration, both the first set of feedback bits and the second set of feedback bits scheduled for transmission to a network entity in a first set of uplink symbols. The slot format change manager 830 may be configured as or otherwise support a means for identifying, based on a change in a format associated with the first set of uplink symbols, that only a subset of the first set of uplink symbols is available for transmission of the first set of feedback bits and the second set of feedback bits. The deferment manager 835 may be configured as or otherwise support a means for determining to defer transmission of one or both of the first set of feedback bits or the second set of feedback bits to a second set of uplink symbols based on availability of the subset of the first set of uplink symbols and on a deferment scheme. The UCI manager 840 may be configured as or otherwise support a means for transmitting the first set of feedback bits and the second set of feedback bits to the network entity in accordance with the deferment scheme.

In some examples, to support transmitting the first set of feedback bits and the second set of feedback bits, the SPS HARQ manager 845 may be configured as or otherwise support a means for deferring, according to the deferment scheme, transmission of the first set of feedback bits and the second set of feedback bits in the first set of uplink symbols. In some examples, to support transmitting the first set of feedback bits and the second set of feedback bits, the SPS HARQ manager 845 may be configured as or otherwise support a means for transmitting, according to the deferment scheme, the first set of feedback bits and the second set of feedback bits in the second set of uplink symbols.

In some examples, to support transmitting the first set of feedback bits and the second set of feedback bits, the SPS HARQ manager 845 may be configured as or otherwise support a means for transmitting, according to the deferment scheme, the first set of feedback bits in the first set of uplink symbols. In some examples, to support transmitting the first set of feedback bits and the second set of feedback bits, the SPS HARQ manager 845 may be configured as or otherwise support a means for deferring, according to the deferment scheme, transmission of the second set of feedback bits in the first set of uplink symbols. In some examples, to support transmitting the first set of feedback bits and the second set of feedback bits, the SPS HARQ manager 845 may be configured as or otherwise support a means for transmitting, according to the deferment scheme, the second set of feedback bits in the second set of uplink symbols.

In some examples, the codebook generation manager 850 may be configured as or otherwise support a means for identifying a preparation time associated with generating a feedback codebook that includes only one of the first set of feedback bits or the second set of feedback bits, where the deferment scheme is based on the preparation time.

In some examples, the packet validity manager 855 may be configured as or otherwise support a means for identifying an expiration time for transmission of the first set of feedback bits, the second set of feedback bits, or both, where the deferment scheme is based on the expiration time.

In some examples, the multiplexing manager 860 may be configured as or otherwise support a means for identifying a third set of feedback bits scheduled to be transmitted to the network entity in the second set of uplink symbols, where the deferment scheme is based on whether the second set of uplink symbols is within a threshold time window and is sufficient for transmission of all of the first set of feedback bits, the second set of feedback bits, and the third set of feedback bits. In some examples, the deferment scheme is based on whether the second set of uplink symbols is within a threshold time window and sufficient for transmission of all of the first set of feedback bits and the second set of feedback bits.

In some examples, the DCI manager 865 may be configured as or otherwise support a means for receiving DCI from the network entity indicating the deferment scheme.

In some examples, the RRC manager 870 may be configured as or otherwise support a means for receiving RRC signaling configuring the deferment scheme in conjunction with at least one of the first SPS configuration or the second SPS configuration. In some examples, the RRC manager 870 may be configured as or otherwise support a means for receiving DCI from the network entity indicating an updated deferment scheme that overrides the RRC signaling configuring the deferment scheme used for transmitting the first set of feedback bits and the second set of feedback bits. In some examples, the RRC manager 870 may be configured as or otherwise support a means for receiving the deferment scheme on a per-SPS configuration basis.

Figure 9:
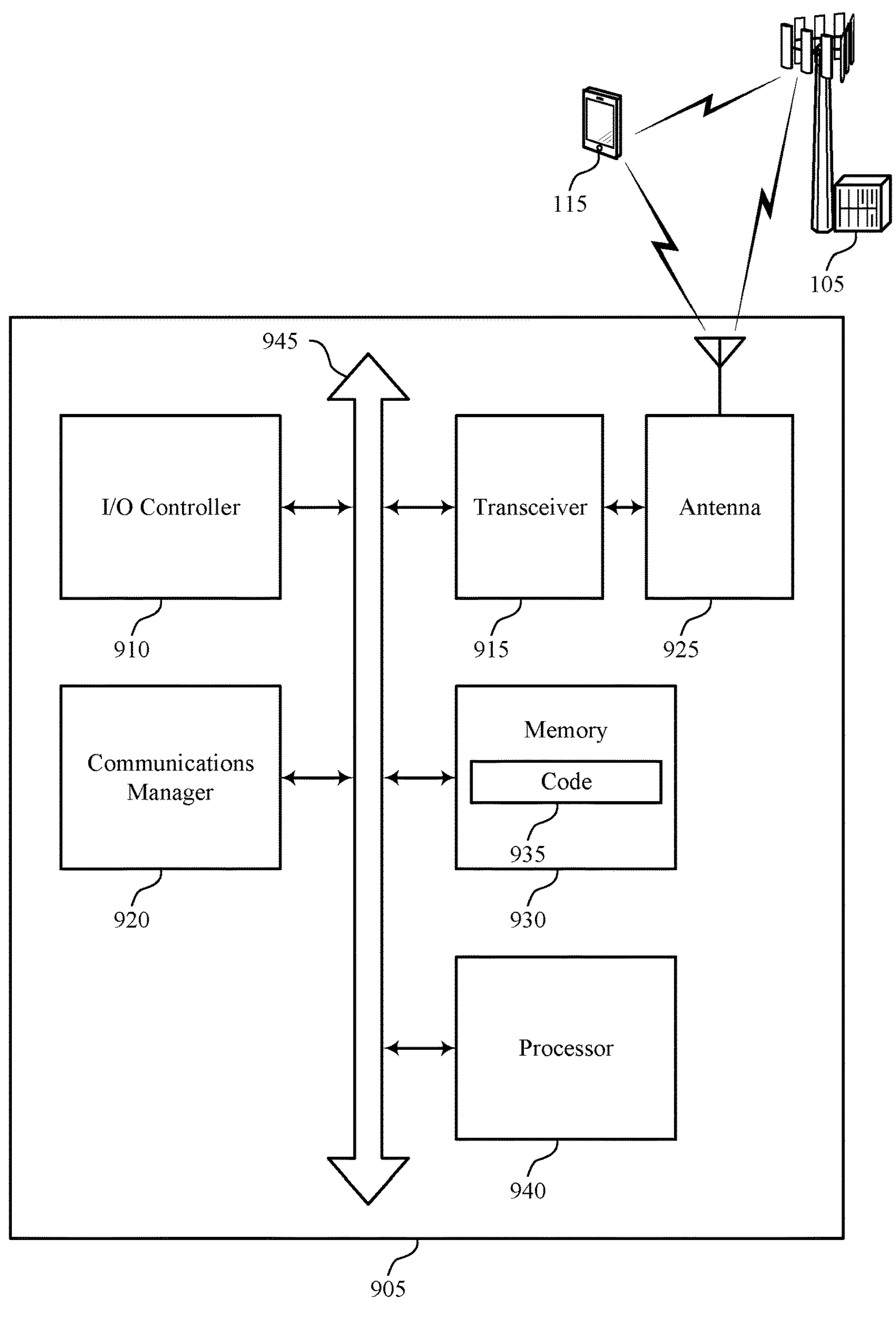
FIG. 9 shows a diagram of a system including a device that supports strategies for deferring SPS uplink control channel transmissions in accordance with aspects of the present disclosure.

FIG. 9 shows a diagram of a system 900 including a device 905 that supports strategies for deferring SPS uplink control channel transmissions in accordance with aspects of the present disclosure. The device 905 may be an example of or include the components of a device 605, a device 705, or a UE 115 as described herein. The device 905 may communicate wirelessly with one or more network entities 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting strategies for deferring SPS uplink control channel transmissions). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for generating a first set of feedback bits associated with a first set of downlink transmissions of a first SPS configuration and a second set of feedback bits associated with a second set of downlink transmissions of a second SPS configuration, both the first set of feedback bits and the second set of feedback bits scheduled for transmission to a network entity in a first set of uplink symbols. The communications manager 920 may be configured as or otherwise support a means for identifying, based on a change in a format associated with the first set of uplink symbols, that only a subset of the first set of uplink symbols is available for transmission of the first set of feedback bits and the second set of feedback bits. The communications manager 920 may be configured as or otherwise support a means for determining to defer transmission of one or both of the first set of feedback bits or the second set of feedback bits to a second set of uplink symbols based on availability of the subset of the first set of uplink symbols and on a deferment scheme. The communications manager 920 may be configured as or otherwise support a means for transmitting the first set of feedback bits and the second set of feedback bits to the network entity in accordance with the deferment scheme.

By including or configuring the communications manager 920 in accordance with examples as described herein, the device 905 may support techniques for improving HARQ-ACK feedback bit transmission as UCI bits in PUCCH when a slot format change reduces the uplink symbols originally scheduled to carry or otherwise convey the HARQ-ACK feedback bits.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of strategies for deferring SPS uplink control channel transmissions as described herein, or the processor 940 and the memory 930 may be otherwise configured to perform or support such operations.

Figure 10:
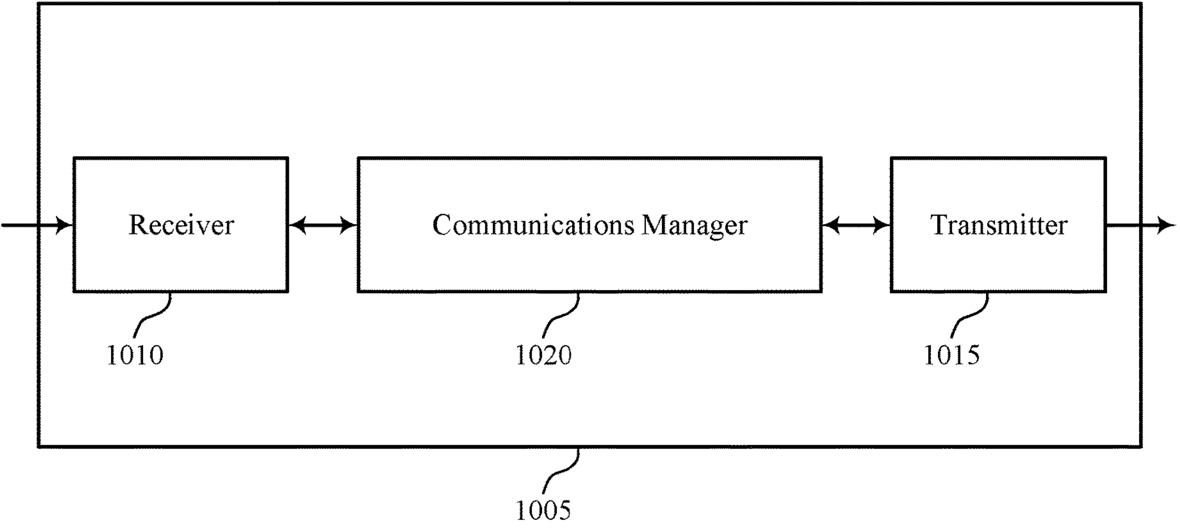
FIGS. 10 and 11 show block diagrams of devices that support strategies for deferring SPS uplink control channel transmissions in accordance with aspects of the present disclosure.

FIG. 10 shows a block diagram 1000 of a device 1005 that supports strategies for deferring SPS uplink control channel transmissions in accordance with aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to strategies for deferring SPS uplink control channel transmissions). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to strategies for deferring SPS uplink control channel transmissions). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of strategies for deferring SPS uplink control channel transmissions as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry), software (e.g., executed by at least one processor), or any combination thereof. The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software) executed by a processor. If implemented in code executed by a processor, the functions of the communications manager 1020, the receiver 1010, the transmitter 1015, or various combinations or components thereof may be performed by a general-purpose processor, a DSP, a CPU, a GPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a network entity in accordance with examples as disclosed herein. For example, the communications manager 1020 may be configured as or otherwise support a means for transmitting, to a UE, a first set of downlink transmissions in accordance with a first SPS configuration and a second set of downlink transmissions in accordance with a second SPS configuration, the first set of downlink transmissions associated with a first set of feedback bits and the second set of downlink transmissions associated with a second set of feedback bits, both the first set of feedback bits and the second set of feedback bits scheduled for transmission to the network entity in a first set of uplink symbols. The communications manager 1020 may be configured as or otherwise support a means for identifying, based on a change in a format associated with the first set of uplink symbols, that only a subset of the first set of uplink symbols is available for transmission of the first set of feedback bits and the second set of feedback bits. The communications manager 1020 may be configured as or otherwise support a means for determining that the UE is to defer transmission of one or both of the first set of feedback bits or the second set of feedback bits to a second set of uplink symbols based on availability of the subset of the first set of uplink symbols and on a deferment scheme. The communications manager 1020 may be configured as or otherwise support a means for monitoring for the first set of feedback bits and the second set of feedback bits in accordance with the deferment scheme.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for improving HARQ-ACK feedback bit transmission as UCI bits in PUCCH when a slot format change reduces the uplink symbols originally scheduled to carry or otherwise convey the HARQ-ACK feedback bits.

Figure 11:
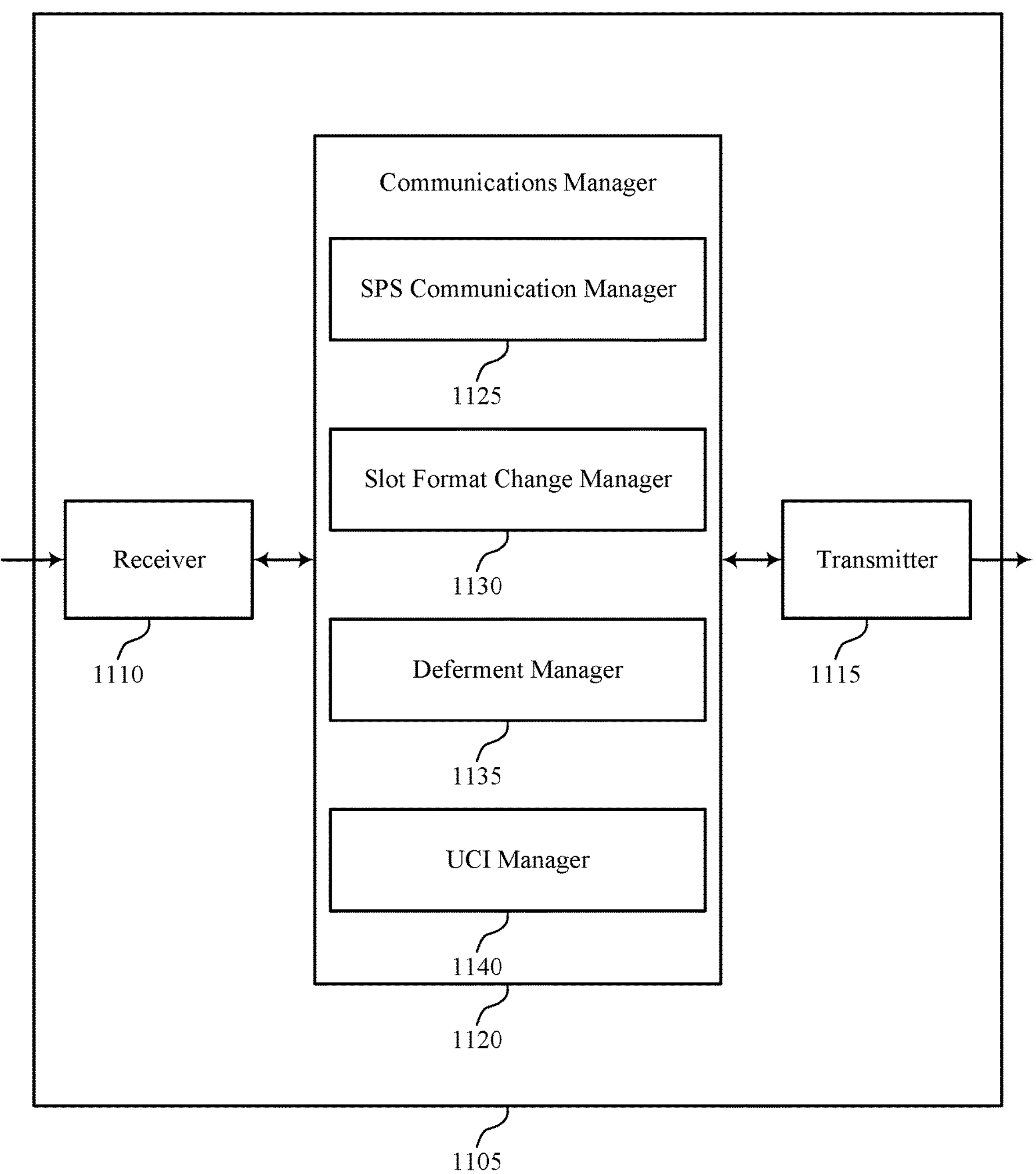

FIG. 11 shows a block diagram 1100 of a device 1105 that supports strategies for deferring SPS uplink control channel transmissions in accordance with aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to strategies for deferring SPS uplink control channel transmissions). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to strategies for deferring SPS uplink control channel transmissions). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of strategies for deferring SPS uplink control channel transmissions as described herein. For example, the communications manager 1120 may include an SPS communication manager 1125, a slot format change manager 1130, a deferment manager 1135, a UCI manager 1140, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a network entity in accordance with examples as disclosed herein. The SPS communication manager 1125 may be configured as or otherwise support a means for transmitting, to a UE, a first set of downlink transmissions in accordance with a first SPS configuration and a second set of downlink transmissions in accordance with a second SPS configuration, the first set of downlink transmissions associated with a first set of feedback bits and the second set of downlink transmissions associated with a second set of feedback bits, both the first set of feedback bits and the second set of feedback bits scheduled for transmission to the network entity in a first set of uplink symbols. The slot format change manager 1130 may be configured as or otherwise support a means for identifying, based on a change in a format associated with the first set of uplink symbols, that only a subset of the first set of uplink symbols is available for transmission of the first set of feedback bits and the second set of feedback bits. The deferment manager 1135 may be configured as or otherwise support a means for determining that the UE is to defer transmission of one or both of the first set of feedback bits or the second set of feedback bits to a second set of uplink symbols based on availability of the subset of the first set of uplink symbols and on a deferment scheme. The UCI manager 1140 may be configured as or otherwise support a means for monitoring for the first set of feedback bits and the second set of feedback bits in accordance with the deferment scheme.

Figure 12:
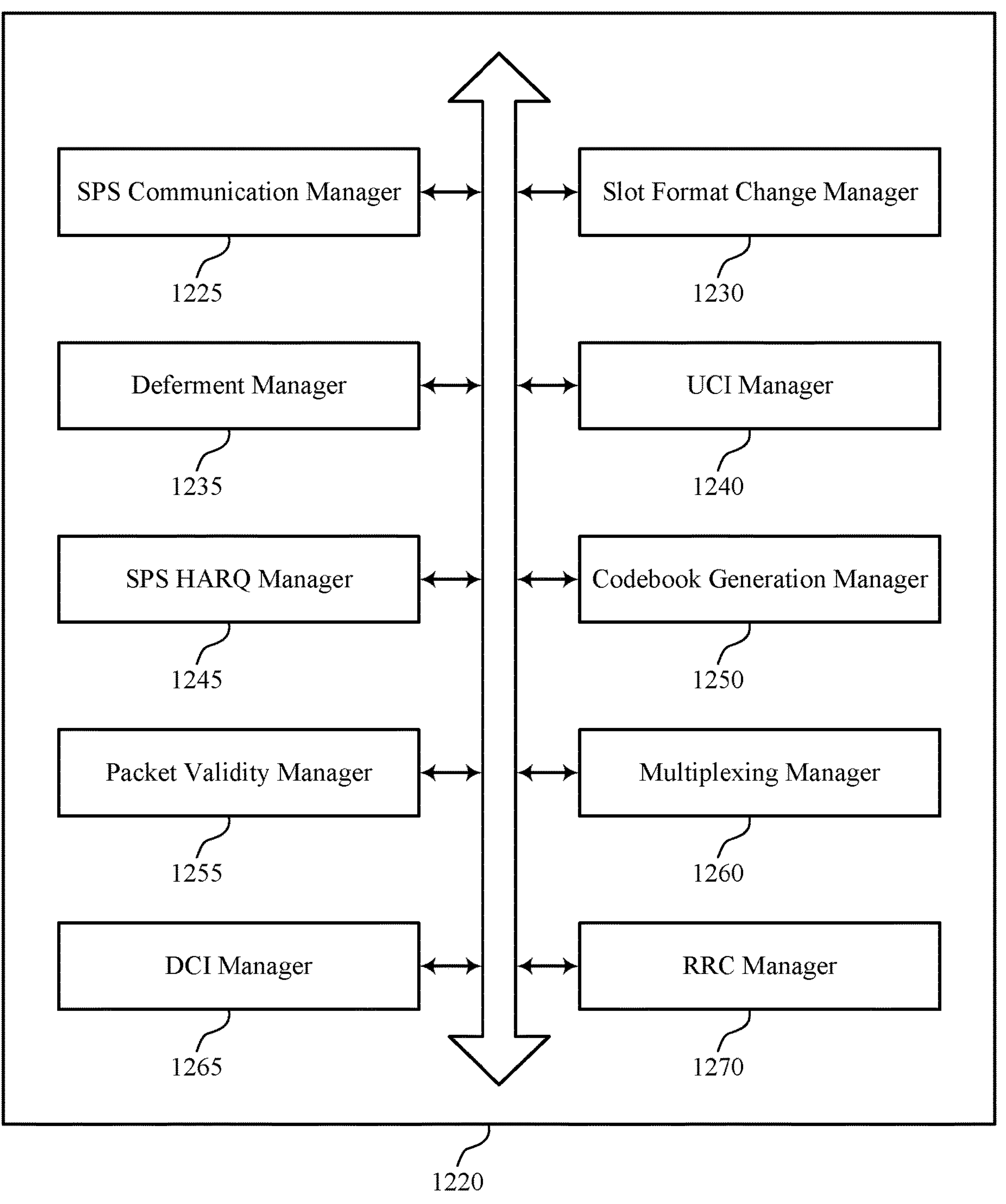
FIG. 12 shows a block diagram of a communications manager that supports strategies for deferring SPS uplink control channel transmissions in accordance with aspects of the present disclosure.

FIG. 12 shows a block diagram 1200 of a communications manager 1220 that supports strategies for deferring SPS uplink control channel transmissions in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of strategies for deferring SPS uplink control channel transmissions as described herein. For example, the communications manager 1220 may include an SPS communication manager 1225, a slot format change manager 1230, a deferment manager 1235, a UCI manager 1240, an SPS HARQ manager 1245, a codebook generation manager 1250, a packet validity manager 1255, a multiplexing manager 1260, a DCI manager 1265, an RRC manager 1270, or any combination thereof. Each of these components may communicate, directly or indirectly, with one another (e.g., via one or more buses).

The communications manager 1220 may support wireless communication at a network entity in accordance with examples as disclosed herein. The SPS communication manager 1225 may be configured as or otherwise support a means for transmitting, to a UE, a first set of downlink transmissions in accordance with a first SPS configuration and a second set of downlink transmissions in accordance with a second SPS configuration, the first set of downlink transmissions associated with a first set of feedback bits and the second set of downlink transmissions associated with a second set of feedback bits, both the first set of feedback bits and the second set of feedback bits scheduled for transmission to the network entity in a first set of uplink symbols. The slot format change manager 1230 may be configured as or otherwise support a means for identifying, based on a change in a format associated with the first set of uplink symbols, that only a subset of the first set of uplink symbols is available for transmission of the first set of feedback bits and the second set of feedback bits. The deferment manager 1235 may be configured as or otherwise support a means for determining that the UE is to defer transmission of one or both of the first set of feedback bits or the second set of feedback bits to a second set of uplink symbols based on availability of the subset of the first set of uplink symbols and on a deferment scheme. The UCI manager 1240 may be configured as or otherwise support a means for monitoring for the first set of feedback bits and the second set of feedback bits in accordance with the deferment scheme.

In some examples, the SPS HARQ manager 1245 may be configured as or otherwise support a means for receiving, according to the deferment scheme, the first set of feedback bits and the second set of feedback bits in the second set of uplink symbols, where the deferment scheme includes deferral of the first set of feedback bits and the second set of feedback bits from the first set of uplink symbols.

In some examples, the SPS HARQ manager 1245 may be configured as or otherwise support a means for receiving, according to the deferment scheme, the first set of feedback bits in the first set of uplink symbols. In some examples, the SPS HARQ manager 1245 may be configured as or otherwise support a means for receiving, according to the deferment scheme, the second set of feedback bits in the second set of uplink symbols, where the deferment scheme includes deferral of only the first set of feedback bits from the first set of uplink symbols.

In some examples, the codebook generation manager 1250 may be configured as or otherwise support a means for identifying a preparation time associated with the UE generating a feedback codebook that includes only one of the first set of feedback bits or the second set of feedback bits, where the deferment scheme is based on the preparation time.

In some examples, the packet validity manager 1255 may be configured as or otherwise support a means for identifying an expiration time for receipt of the first set of feedback bits, the second set of feedback bits, or both, where the deferment scheme is based on the expiration time.

In some examples, the multiplexing manager 1260 may be configured as or otherwise support a means for identifying a third set of feedback bits scheduled to be received from the UE in the second set of uplink symbols, where the deferment scheme is based on whether the second set of uplink symbols is within a threshold time window and is sufficient for transmission of all of the first set of feedback bits, the second set of feedback bits, and the third set of feedback bits. In some examples, the deferment scheme is based on whether the second set of uplink symbols is within a threshold time window and sufficient for transmission of all of the first set of feedback bits and the second set of feedback bits.

In some examples, the DCI manager 1265 may be configured as or otherwise support a means for transmitting DCI to the UE indicating the deferment scheme.

In some examples, the RRC manager 1270 may be configured as or otherwise support a means for transmitting RRC signaling configuring the deferment scheme in conjunction with at least one of the first SPS configuration or the second SPS configuration. In some examples, the RRC manager 1270 may be configured as or otherwise support a means for transmitting DCI to the UE indicating an updated deferment scheme that overrides the RRC signaling configuring the deferment scheme used for transmitting the first set of feedback bits and the second set of feedback bits. In some examples, the RRC manager 1270 may be configured as or otherwise support a means for transmitting the deferment scheme on a per-SPS configuration basis.

Figure 13:
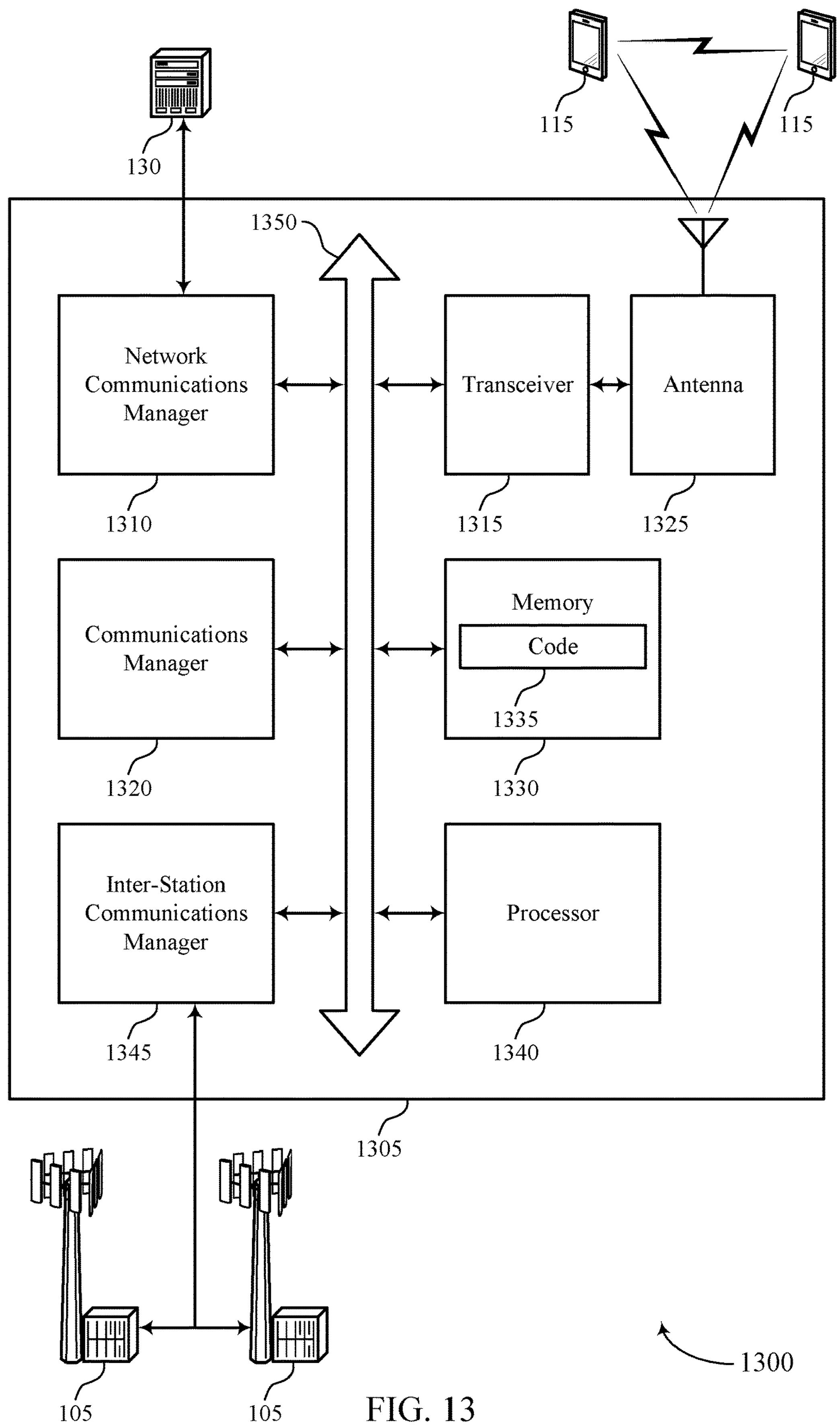
FIG. 13 shows a diagram of a system including a device that supports strategies for deferring SPS uplink control channel transmissions in accordance with aspects of the present disclosure.

FIG. 13 shows a diagram of a system 1300 including a device 1305 that supports strategies for deferring SPS uplink control channel transmissions in accordance with aspects of the present disclosure. The device 1305 may be an example of or include the components of a device 1005, a device 1105, or a network entity 105 as described herein. The device 1305 may communicate wirelessly with one or more network entities 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting strategies for deferring SPS uplink control channel transmissions). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other network entities 105, and may include a controller or scheduler for controlling communications with UEs 115 in cooperation with other network entities 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between network entities 105.

The communications manager 1320 may support wireless communication at a network entity in accordance with examples as disclosed herein. For example, the communications manager 1320 may be configured as or otherwise support a means for transmitting, to a UE, a first set of downlink transmissions in accordance with a first SPS configuration and a second set of downlink transmissions in accordance with a second SPS configuration, the first set of downlink transmissions associated with a first set of feedback bits and the second set of downlink transmissions associated with a second set of feedback bits, both the first set of feedback bits and the second set of feedback bits scheduled for transmission to the network entity in a first set of uplink symbols. The communications manager 1320 may be configured as or otherwise support a means for identifying, based on a change in a format associated with the first set of uplink symbols, that only a subset of the first set of uplink symbols is available for transmission of the first set of feedback bits and the second set of feedback bits. The communications manager 1320 may be configured as or otherwise support a means for determining that the UE is to defer transmission of one or both of the first set of feedback bits or the second set of feedback bits to a second set of uplink symbols based on availability of the subset of the first set of uplink symbols and on a deferment scheme. The communications manager 1320 may be configured as or otherwise support a means for monitoring for the first set of feedback bits and the second set of feedback bits in accordance with the deferment scheme.

By including or configuring the communications manager 1320 in accordance with examples as described herein, the device 1305 may support techniques for improving HARQ-ACK feedback bit transmission as UCI bits in PUCCH when a slot format change reduces the uplink symbols originally scheduled to carry or otherwise convey the HARQ-ACK feedback bits.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of strategies for deferring SPS uplink control channel transmissions as described herein, or the processor 1340 and the memory 1330 may be otherwise configured to perform or support such operations.

Figure 14:
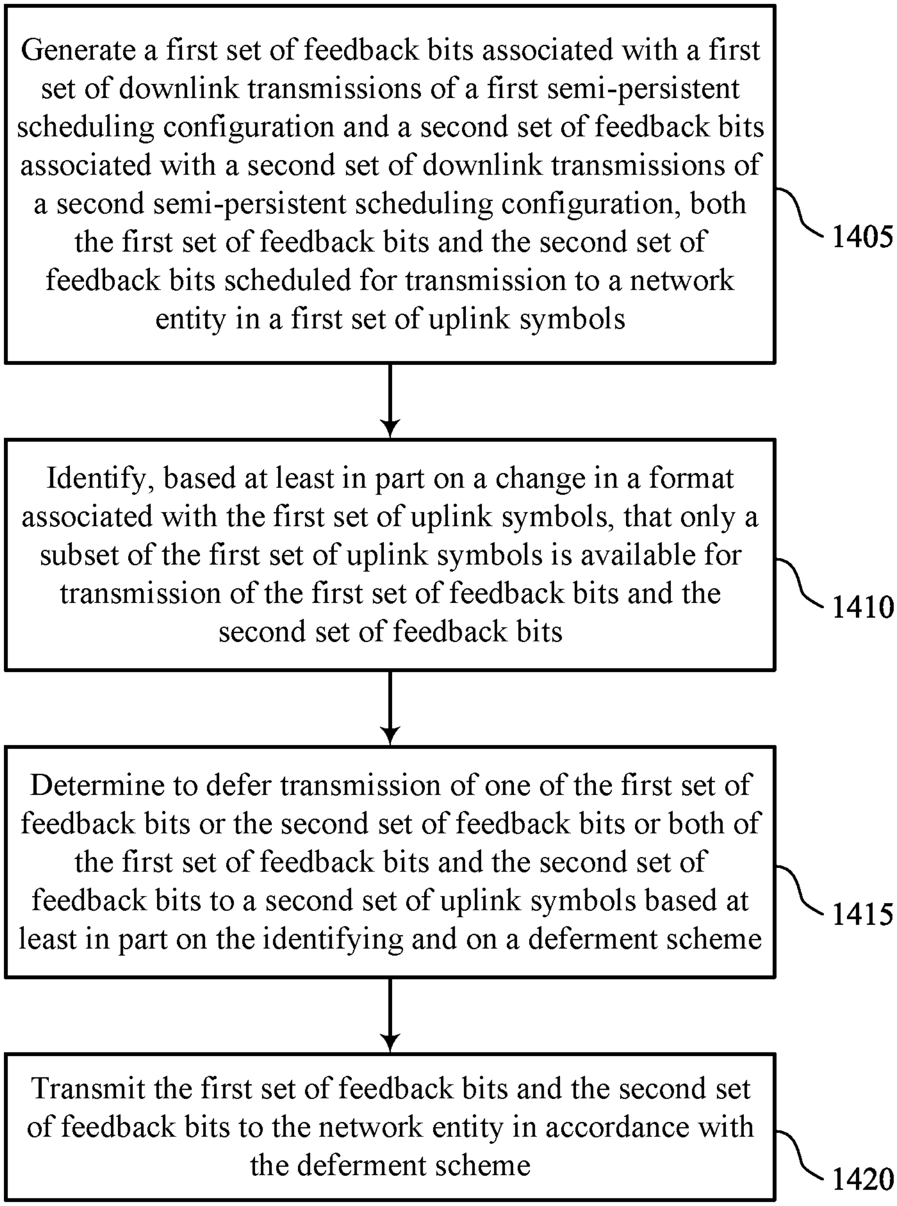

FIG. 14 shows a flowchart illustrating a method 1400 that supports strategies for deferring SPS uplink control channel transmissions in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include generating a first set of feedback bits associated with a first set of downlink transmissions of a first SPS configuration and a second set of feedback bits associated with a second set of downlink transmissions of a second SPS configuration, both the first set of feedback bits and the second set of feedback bits scheduled for transmission to a network entity in a first set of uplink symbols. The operations of 1405 may be performed in accordance with examples as disclosed herein. In some examples, aspects of the operations of 1405 may be performed by an SPS communication manager 825 as described with reference to FIG. 8.

At 1410, the method may include identifying, based on a change in a format associated with the first set of uplink symbols, that only a subset of the first set of uplink symbols is available for transmission of the first set of feedback bits and the second set of feedback bits. The operations of 1410 may be performed in accordance with examples as disclosed herein. In some examples, aspects of the operations of 1410 may be performed by a slot format change manager 830 as described with reference to FIG. 8.

At 1415, the method may include determining to defer transmission of one of the first set of feedback bits or the second set of feedback bits or both of the first set of feedback bits and the second set of feedback bits to a second set of uplink symbols based on the identifying and on a deferment scheme. The operations of 1415 may be performed in accordance with examples as disclosed herein. In some examples, aspects of the operations of 1415 may be performed by a deferment manager 835 as described with reference to FIG. 8.

At 1420, the method may include transmitting the first set of feedback bits and the second set of feedback bits to the network entity in accordance with the deferment scheme. The operations of 1420 may be performed in accordance with examples as disclosed herein. In some examples, aspects of the operations of 1420 may be performed by a UCI manager 840 as described with reference to FIG. 8.

Figure 15:
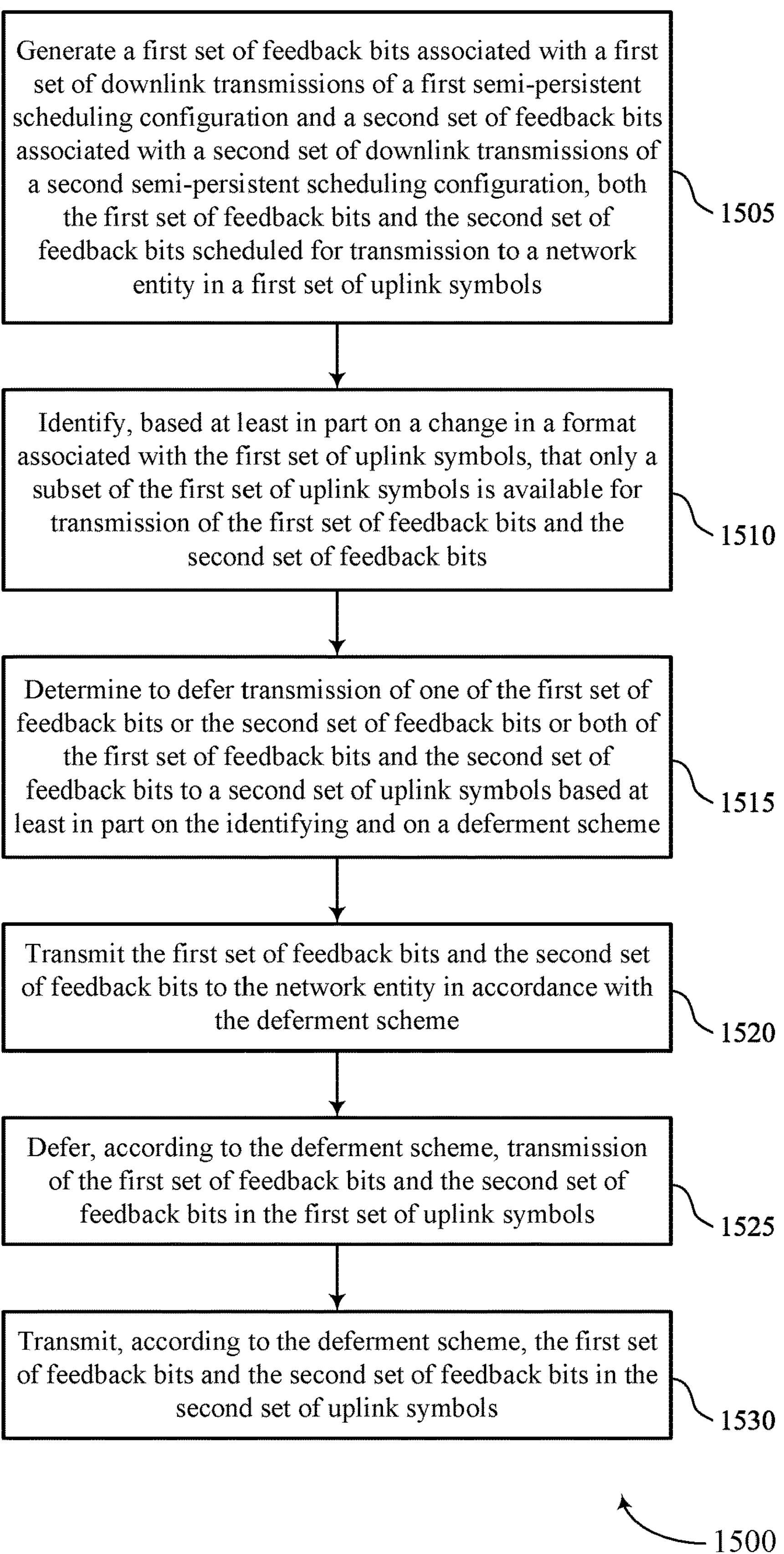

FIG. 15 shows a flowchart illustrating a method 1500 that supports strategies for deferring SPS uplink control channel transmissions in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include generating a first set of feedback bits associated with a first set of downlink transmissions of a first SPS configuration and a second set of feedback bits associated with a second set of downlink transmissions of a second SPS configuration, both the first set of feedback bits and the second set of feedback bits scheduled for transmission to a network entity in a first set of uplink symbols. The operations of 1505 may be performed in accordance with examples as disclosed herein. In some examples, aspects of the operations of 1505 may be performed by an SPS communication manager 825 as described with reference to FIG. 8.

At 1510, the method may include identifying, based on a change in a format associated with the first set of uplink symbols, that only a subset of the first set of uplink symbols is available for transmission of the first set of feedback bits and the second set of feedback bits. The operations of 1510 may be performed in accordance with examples as disclosed herein. In some examples, aspects of the operations of 1510 may be performed by a slot format change manager 830 as described with reference to FIG. 8.

At 1515, the method may include determining to defer transmission of one of the first set of feedback bits or the second set of feedback bits or both of the first set of feedback bits and the second set of feedback bits to a second set of uplink symbols based on the identifying and on a deferment scheme. The operations of 1515 may be performed in accordance with examples as disclosed herein. In some examples, aspects of the operations of 1515 may be performed by a deferment manager 835 as described with reference to FIG. 8.

At 1520, the method may include transmitting the first set of feedback bits and the second set of feedback bits to the network entity in accordance with the deferment scheme. The operations of 1520 may be performed in accordance with examples as disclosed herein. In some examples, aspects of the operations of 1520 may be performed by a UCI manager 840 as described with reference to FIG. 8.

At 1525, the method may include deferring, according to the deferment scheme, transmission of the first set of feedback bits and the second set of feedback bits in the first set of uplink symbols. The operations of 1525 may be performed in accordance with examples as disclosed herein. In some examples, aspects of the operations of 1525 may be performed by an SPS HARQ manager 845 as described with reference to FIG. 8.

At 1530, the method may include transmitting, according to the deferment scheme, the first set of feedback bits and the second set of feedback bits in the second set of uplink symbols. The operations of 1530 may be performed in accordance with examples as disclosed herein. In some examples, aspects of the operations of 1530 may be performed by an SPS HARQ manager 845 as described with reference to FIG. 8.

Figure 16:
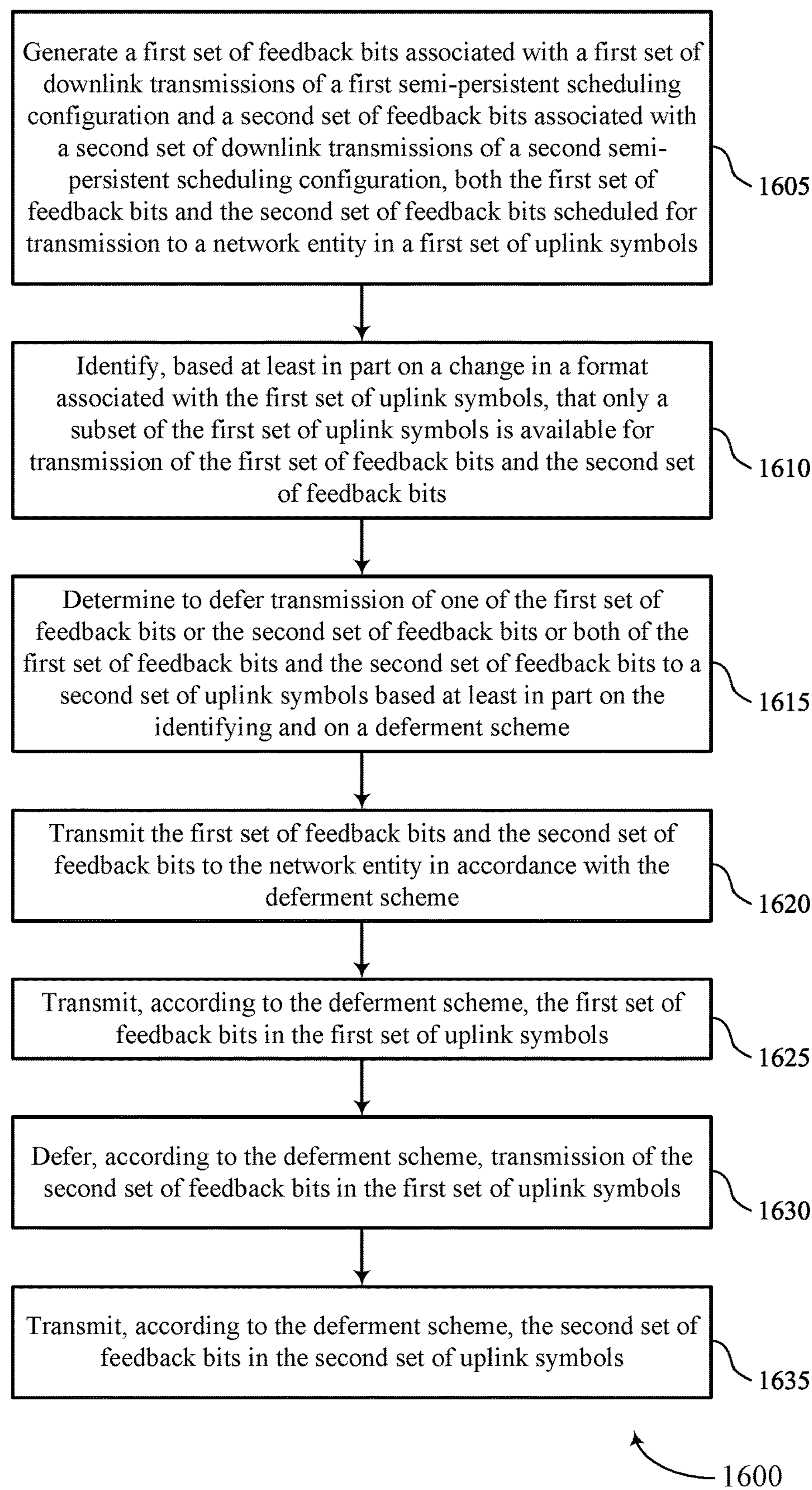

FIG. 16 shows a flowchart illustrating a method 1600 that supports strategies for deferring SPS uplink control channel transmissions in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include generating a first set of feedback bits associated with a first set of downlink transmissions of a first SPS configuration and a second set of feedback bits associated with a second set of downlink transmissions of a second SPS configuration, both the first set of feedback bits and the second set of feedback bits scheduled for transmission to a network entity in a first set of uplink symbols. The operations of 1605 may be performed in accordance with examples as disclosed herein. In some examples, aspects of the operations of 1605 may be performed by an SPS communication manager 825 as described with reference to FIG. 8.

At 1610, the method may include identifying, based on a change in a format associated with the first set of uplink symbols, that only a subset of the first set of uplink symbols is available for transmission of the first set of feedback bits and the second set of feedback bits. The operations of 1610 may be performed in accordance with examples as disclosed herein. In some examples, aspects of the operations of 1610 may be performed by a slot format change manager 830 as described with reference to FIG. 8.

At 1615, the method may include determining to defer transmission of one of the first set of feedback bits or the second set of feedback bits or both of the first set of feedback bits and the second set of feedback bits to a second set of uplink symbols based on the identifying and on a deferment scheme. The operations of 1615 may be performed in accordance with examples as disclosed herein. In some examples, aspects of the operations of 1615 may be performed by a deferment manager 835 as described with reference to FIG. 8.

At 1620, the method may include transmitting the first set of feedback bits and the second set of feedback bits to the network entity in accordance with the deferment scheme. The operations of 1620 may be performed in accordance with examples as disclosed herein. In some examples, aspects of the operations of 1620 may be performed by a UCI manager 840 as described with reference to FIG. 8.

At 1625, the method may include transmitting, according to the deferment scheme, the first set of feedback bits in the first set of uplink symbols. The operations of 1625 may be performed in accordance with examples as disclosed herein. In some examples, aspects of the operations of 1625 may be performed by an SPS HARQ manager 845 as described with reference to FIG. 8.

At 1630, the method may include deferring, according to the deferment scheme, transmission of the second set of feedback bits in the first set of uplink symbols. The operations of 1630 may be performed in accordance with examples as disclosed herein. In some examples, aspects of the operations of 1630 may be performed by an SPS HARQ manager 845 as described with reference to FIG. 8.

At 1635, the method may include transmitting, according to the deferment scheme, the second set of feedback bits in the second set of uplink symbols. The operations of 1635 may be performed in accordance with examples as disclosed herein. In some examples, aspects of the operations of 1635 may be performed by an SPS HARQ manager 845 as described with reference to FIG. 8.

FIG. 17 shows a flowchart illustrating a method 1700 that supports strategies for deferring SPS uplink control channel transmissions in accordance with aspects of the present disclosure. The operations of the method 1700 may be implemented by a network entity or its components as described herein. For example, the operations of the method 1700 may be performed by a network entity 105 as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include transmitting, to a UE, a first set of downlink transmissions in accordance with a first SPS configuration and a second set of downlink transmissions in accordance with a second SPS configuration, the first set of downlink transmissions associated with a first set of feedback bits and the second set of downlink transmissions associated with a second set of feedback bits, both the first set of feedback bits and the second set of feedback bits scheduled for transmission to the network entity in a first set of uplink symbols. The operations of 1705 may be performed in accordance with examples as disclosed herein. In some examples, aspects of the operations of 1705 may be performed by an SPS communication manager 1225 as described with reference to FIG. 12.

At 1710, the method may include identifying, based on a change in a format associated with the first set of uplink symbols, that only a subset of the first set of uplink symbols is available for transmission of the first set of feedback bits and the second set of feedback bits. The operations of 1710 may be performed in accordance with examples as disclosed herein. In some examples, aspects of the operations of 1710 may be performed by a slot format change manager 1230 as described with reference to FIG. 12.

At 1715, the method may include determining that the UE is to defer transmission of one of the first set of feedback bits or the second set of feedback bits or both of the first set of feedback bits and the second set of feedback bits to a second set of uplink symbols based on the identifying and on a deferment scheme. The operations of 1715 may be performed in accordance with examples as disclosed herein. In some examples, aspects of the operations of 1715 may be performed by a deferment manager 1235 as described with reference to FIG. 12.

At 1720, the method may include monitoring for the first set of feedback bits and the second set of feedback bits in accordance with the deferment scheme. The operations of 1720 may be performed in accordance with examples as disclosed herein. In some examples, aspects of the operations of 1720 may be performed by a UCI manager 1240 as described with reference to FIG. 12.

Figure 18:
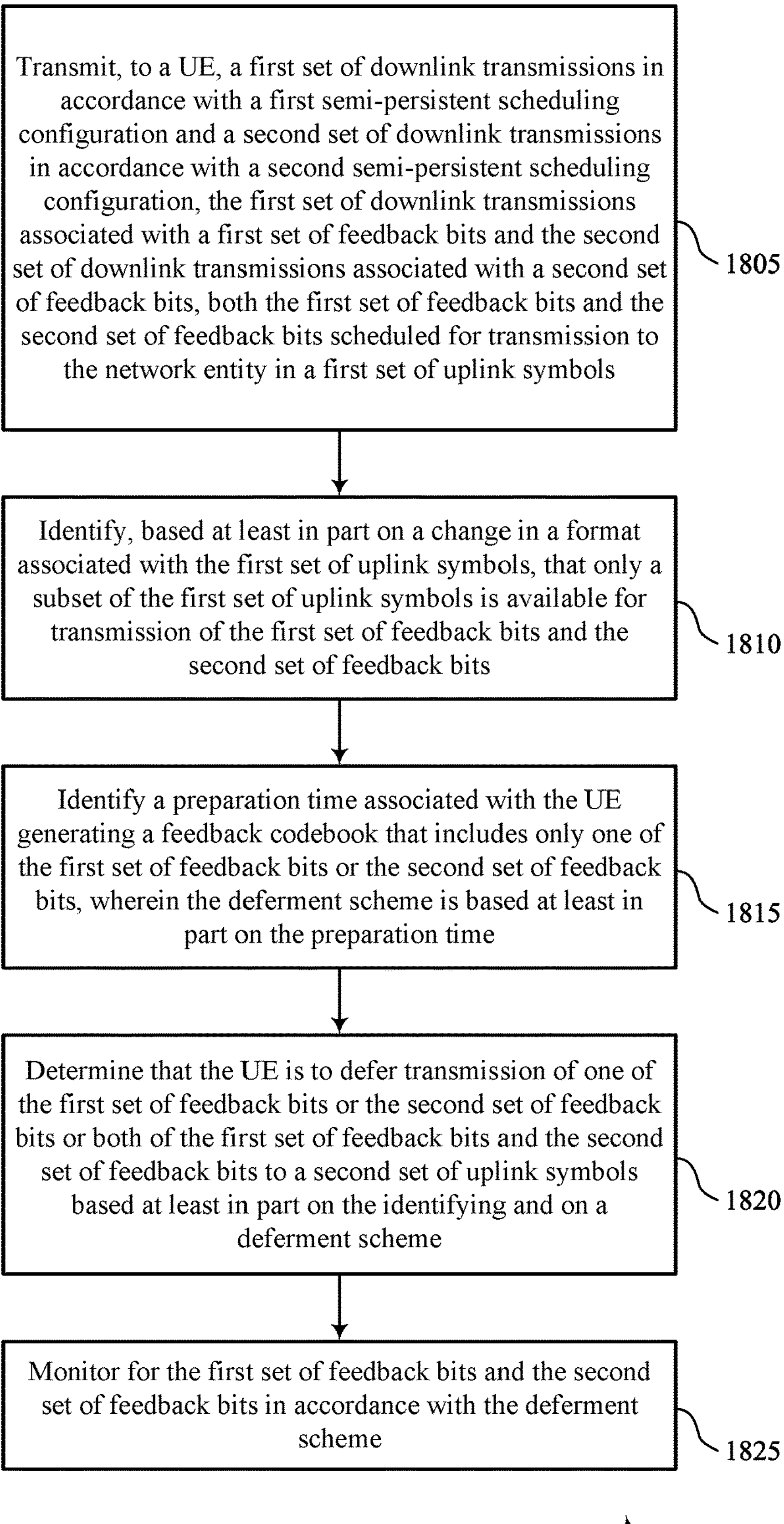

FIG. 18 shows a flowchart illustrating a method 1800 that supports strategies for deferring SPS uplink control channel transmissions in accordance with aspects of the present disclosure. The operations of the method 1800 may be implemented by a network entity or its components as described herein. For example, the operations of the method 1800 may be performed by a network entity 105 as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1805, the method may include transmitting, to a UE, a first set of downlink transmissions in accordance with a first SPS configuration and a second set of downlink transmissions in accordance with a second SPS configuration, the first set of downlink transmissions associated with a first set of feedback bits and the second set of downlink transmissions associated with a second set of feedback bits, both the first set of feedback bits and the second set of feedback bits scheduled for transmission to the network entity in a first set of uplink symbols. The operations of 1805 may be performed in accordance with examples as disclosed herein. In some examples, aspects of the operations of 1805 may be performed by an SPS communication manager 1225 as described with reference to FIG. 12.

At 1810, the method may include identifying, based on a change in a format associated with the first set of uplink symbols, that only a subset of the first set of uplink symbols is available for transmission of the first set of feedback bits and the second set of feedback bits. The operations of 1810 may be performed in accordance with examples as disclosed herein. In some examples, aspects of the operations of 1810 may be performed by a slot format change manager 1230 as described with reference to FIG. 12.

At 1815, the method may include identifying a preparation time associated with the UE generating a feedback codebook that includes only one of the first set of feedback bits or the second set of feedback bits, where the deferment scheme is based on the preparation time. The operations of 1815 may be performed in accordance with examples as disclosed herein. In some examples, aspects of the operations of 1815 may be performed by a codebook generation manager 1250 as described with reference to FIG. 12.

At 1820, the method may include determining that the UE is to defer transmission of one of the first set of feedback bits or the second set of feedback bits or both of the first set of feedback bits and the second set of feedback bits to a second set of uplink symbols based on the identifying and on a deferment scheme. The operations of 1820 may be performed in accordance with examples as disclosed herein. In some examples, aspects of the operations of 1820 may be performed by a deferment manager 1235 as described with reference to FIG. 12.

At 1825, the method may include monitoring for the first set of feedback bits and the second set of feedback bits in accordance with the deferment scheme. The operations of 1825 may be performed in accordance with examples as disclosed herein. In some examples, aspects of the operations of 1825 may be performed by a UCI manager 1240 as described with reference to FIG. 12.

The following provides an overview of aspects of the present disclosure:

Aspect 1: A method for wireless communication at a UE, comprising: generating a first set of feedback bits associated with a first set of downlink transmissions of a first SPS configuration and a second set of feedback bits associated with a second set of downlink transmissions of a second SPS configuration, both the first set of feedback bits and the second set of feedback bits scheduled for transmission to a network entity in a first set of uplink symbols; identifying, based at least in part on a change in a format associated with the first set of uplink symbols, that only a subset of the first set of uplink symbols is available for transmission of the first set of feedback bits and the second set of feedback bits; determining to defer transmission of one of the first set of feedback bits or the second set of feedback bits or both of the first set of feedback bits and the second set of feedback bits to a second set of uplink symbols based at least in part on the identifying and on a deferment scheme; and transmitting the first set of feedback bits and the second set of feedback bits to the network entity in accordance with the deferment scheme.

Aspect 2: The method of aspect 1, wherein transmitting the first set of feedback bits and the second set of feedback bits further comprises: deferring, according to the deferment scheme, transmission of the first set of feedback bits and the second set of feedback bits in the first set of uplink symbols;

and transmitting, according to the deferment scheme, the first set of feedback bits and the second set of feedback bits in the second set of uplink symbols.

Aspect 3: The method of any of aspects 1 through 2, wherein transmitting the first set of feedback bits and the second set of feedback bits further comprises: transmitting, according to the deferment scheme, the first set of feedback bits in the first set of uplink symbols; deferring, according to the deferment scheme, transmission of the second set of feedback bits in the first set of uplink symbols; and transmitting, according to the deferment scheme, the second set of feedback bits in the second set of uplink symbols.

Aspect 4: The method of any of aspects 1 through 3, further comprising: identifying a preparation time associated with generating a feedback codebook that includes only one of the first set of feedback bits or the second set of feedback bits, wherein the deferment scheme is based at least in part on the preparation time.

Aspect 5: The method of any of aspects 1 through 4, further comprising: identifying an expiration time for transmission of the first set of feedback bits, the second set of feedback bits, or both, wherein the deferment scheme is based at least in part on the expiration time.

Aspect 6: The method of any of aspects 1 through 5, further comprising: identifying a third set of feedback bits scheduled to be transmitted to the network entity in the second set of uplink symbols, wherein the deferment scheme is based at least in part on whether the second set of uplink symbols is within a threshold time window and is sufficient for transmission of all of the first set of feedback bits, the second set of feedback bits, and the third set of feedback bits.

Aspect 7: The method of any of aspects 1 through 6, wherein the deferment scheme is based at least in part on whether the second set of uplink symbols is within a threshold time window and sufficient for transmission of all of the first set of feedback bits and the second set of feedback bits.

Aspect 8: The method of any of aspects 1 through 7, further comprising: receiving DCI from the network entity indicating the deferment scheme.

Aspect 9: The method of any of aspects 1 through 8, further comprising: receiving RRC signaling configuring the deferment scheme in conjunction with at least one of the first SPS configuration or the second SPS configuration.

Aspect 10: The method of aspect 9, further comprising: receiving DCI from the network entity indicating an updated deferment scheme that overrides the RRC signaling configuring the deferment scheme used for transmitting the first set of feedback bits and the second set of feedback bits.

Aspect 11: The method of any of aspects 1 through 10, further comprising: receiving the deferment scheme on a per-SPS configuration basis.

Aspect 12: A method for wireless communication at a network entity, comprising: transmitting, to a UE, a first set of downlink transmissions in accordance with a first SPS configuration and a second set of downlink transmissions in accordance with a second SPS configuration, the first set of downlink transmissions associated with a first set of feedback bits and the second set of downlink transmissions associated with a second set of feedback bits, both the first set of feedback bits and the second set of feedback bits scheduled for transmission to the network entity in a first set of uplink symbols; identifying, based at least in part on a change in a format associated with the first set of uplink symbols, that only a subset of the first set of uplink symbols is available for transmission of the first set of feedback bits and the second set of feedback bits; determining that the UE is to defer transmission of one of the first set of feedback bits or the second set of feedback bits or both of the first set of feedback bits and the second set of feedback bits to a second set of uplink symbols based at least in part on the identifying and on a deferment scheme; and monitoring for the first set of feedback bits and the second set of feedback bits in accordance with the deferment scheme.

Aspect 13: The method of aspect 12, further comprising: receiving, according to the deferment scheme, the first set of feedback bits and the second set of feedback bits in the second set of uplink symbols, wherein the deferment scheme includes deferral of the first set of feedback bits and the second set of feedback bits from the first set of uplink symbols.

Aspect 14: The method of any of aspects 12 through 13, further comprising: receiving, according to the deferment scheme, the first set of feedback bits in the first set of uplink symbols; and receiving, according to the deferment scheme, the second set of feedback bits in the second set of uplink symbols, wherein the deferment scheme includes deferral of only the first set of feedback bits from the first set of uplink symbols.

Aspect 15: The method of any of aspects 12 through 14, further comprising: identifying a preparation time associated with the UE generating a feedback codebook that includes only one of the first set of feedback bits or the second set of feedback bits, wherein the deferment scheme is based at least in part on the preparation time.

Aspect 16: The method of any of aspects 12 through 15, further comprising: identifying an expiration time for receipt of the first set of feedback bits, the second set of feedback bits, or both, wherein the deferment scheme is based at least in part on the expiration time.

Aspect 17: The method of any of aspects 12 through 16, further comprising: identifying a third set of feedback bits scheduled to be received from the UE in the second set of uplink symbols, wherein the deferment scheme is based at least in part on whether the second set of uplink symbols is within a threshold time window and is sufficient for transmission of all of the first set of feedback bits, the second set of feedback bits, and the third set of feedback bits.

Aspect 18: The method of any of aspects 12 through 17, wherein the deferment scheme is based at least in part on whether the second set of uplink symbols is within a threshold time window and sufficient for transmission of all of the first set of feedback bits and the second set of feedback bits.

Aspect 19: The method of any of aspects 12 through 18, further comprising: transmitting DCI to the UE indicating the deferment scheme.

Aspect 20: The method of any of aspects 12 through 19, further comprising: transmitting RRC signaling configuring the deferment scheme in conjunction with at least one of the first SPS configuration or the second SPS configuration.

Aspect 21: The method of aspect 20, further comprising: transmitting DCI to the UE indicating an updated deferment scheme that overrides the RRC signaling configuring the deferment scheme used for transmitting the first set of feedback bits and the second set of feedback bits.

Aspect 22: The method of any of aspects 12 through 21, further comprising: transmitting the deferment scheme on a per-SPS configuration basis.

Aspect 23: An apparatus for wireless communication at a UE, comprising at least one processor; and memory coupled with the at least one processor, the memory storing instructions executable by the at least one processor to cause the apparatus or UE to perform a method of any of aspects 1 through 11.

Aspect 24: An apparatus for wireless communication at a UE, comprising at least one means for performing a method of any of aspects 1 through 11.

Aspect 25: A non-transitory computer-readable medium storing code for wireless communication at a UE, the code comprising instructions executable by a processor to perform a method of any of aspects 1 through 11.

Aspect 26: An apparatus for wireless communication at a network entity, comprising at least one processor; and memory coupled with the processor, the memory storing instructions executable by the at least one processor to cause the apparatus or network entity to perform a method of any of aspects 12 through 22.

Aspect 27: An apparatus for wireless communication at a network entity, comprising at least one means for performing a method of any of aspects 12 through 22.

Aspect 28: A non-transitory computer-readable medium storing code for wireless communication at a network entity, the code comprising instructions executable by a processor to perform a method of any of aspects 12 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

The term "determine" or "determining" encompasses a wide variety of actions and, therefore, "determining" can include calculating, computing, processing, deriving, investigating, looking up (such as via looking up in a table, a database or another data structure), or ascertaining. Also, "determining" can include receiving (such as receiving information) or accessing (such as accessing data in a memory). Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

generating a first set of feedback bits associated with a first set of downlink transmissions of a first semi-persistent scheduling configuration and a second set of feedback bits associated with a second set of downlink transmissions of a second semi-persistent scheduling configuration, the first semi-persistent scheduling configuration different from the second semi-persistent scheduling configuration, both the first set of feedback bits and the second set of feedback bits scheduled for transmission to a network entity in a first set of uplink symbols;

identifying that only a subset of the first set of uplink symbols is available for transmission of the first set of feedback bits and the second set of feedback bits;

determining to defer transmission of one of the first set of feedback bits or the second set of feedback bits or both of the first set of feedback bits and the second set of feedback bits to a second set of uplink symbols based at least in part on the identifying and on a deferment scheme; and transmitting the first set of feedback bits and the second set of feedback bits to the network entity in accordance with the deferment scheme.

2. The method of claim 1, wherein transmitting the first set of feedback bits and the second set of feedback bits further comprises:

deferring, according to the deferment scheme, transmission of the first set of feedback bits and the second set of feedback bits in the first set of uplink symbols; and transmitting, according to the deferment scheme, the first set of feedback bits and the second set of feedback bits in the second set of uplink symbols.

3. The method of claim 1, wherein transmitting the first set of feedback bits and the second set of feedback bits further comprises:

transmitting, according to the deferment scheme, the first set of feedback bits in the first set of uplink symbols;

deferring, according to the deferment scheme, transmission of the second set of feedback bits in the first set of uplink symbols; and transmitting, according to the deferment scheme, the second set of feedback bits in the second set of uplink symbols.

4. The method of claim 1, wherein transmitting the first set of feedback bits and the second set of feedback bits further comprises:

transmitting, according to the deferment scheme and based at least in part on a first priority level associated with the first set of feedback bits, the first set of feedback bits in the first set of uplink symbols; and transmitting, according to the deferment scheme and based at least in part on a second priority level associated with the second set of feedback bits being lower than the first priority level, the second set of feedback bits in the second set of uplink symbols.

5. The method of claim 1, further comprising:

identifying a preparation time associated with generating a feedback codebook that includes only one of the first set of feedback bits or the second set of feedback bits, wherein the deferment scheme is based at least in part on the preparation time.

6. The method of claim 1, further comprising:

identifying an expiration time for transmission of the first set of feedback bits, the second set of feedback bits, or both, wherein the deferment scheme is based at least in part on the expiration time.

7. The method of claim 1, further comprising:

identifying a third set of feedback bits scheduled to be transmitted to the network entity in the second set of uplink symbols, wherein the deferment scheme is based at least in part on whether the second set of uplink symbols is within a threshold time window and is sufficient for transmission of all of the first set of feedback bits, the second set of feedback bits, and the third set of feedback bits.

8. The method of claim 1, wherein the deferment scheme is based at least in part on whether the second set of uplink symbols is within a threshold time window and sufficient for transmission of all of the first set of feedback bits and the second set of feedback bits.

9. The method of claim 1, further comprising:

receiving downlink control information from the network entity indicating the deferment scheme.

10. The method of claim 1, further comprising:

receiving radio resource control signaling configuring the deferment scheme in conjunction with at least one of the first semi-persistent scheduling configuration or the second semi-persistent scheduling configuration.

11. The method of claim 10, further comprising:

receiving downlink control information from the network entity indicating an updated deferment scheme that overrides the radio resource control signaling configuring the deferment scheme used for transmitting the first set of feedback bits and the second set of feedback bits.

12. The method of claim 1, further comprising:

receiving the deferment scheme on a per-semi-persistent scheduling configuration basis.

13. A method for wireless communication at a network entity, comprising:

transmitting, to a user equipment (UE), a first set of downlink transmissions in accordance with a first semi-persistent scheduling configuration and a second set of downlink transmissions in accordance with a second semi-persistent scheduling configuration, the first semi-persistent scheduling configuration different from the second semi-persistent scheduling configuration, the first set of downlink transmissions associated with a first set of feedback bits and the second set of downlink transmissions associated with a second set of feedback bits, both the first set of feedback bits and the second set of feedback bits scheduled for transmission to the network entity in a first set of uplink symbols;

identifying that only a subset of the first set of uplink symbols is available for transmission of the first set of feedback bits and the second set of feedback bits;

determining that the UE is to defer transmission of one of the first set of feedback bits or the second set of feedback bits or both of the first set of feedback bits and the second set of feedback bits to a second set of uplink symbols based at least in part on the identifying and on a deferment scheme; and monitoring for the first set of feedback bits and the second set of feedback bits in accordance with the deferment scheme.

14. The method of claim 13, further comprising:

receiving, according to the deferment scheme, the first set of feedback bits and the second set of feedback bits in the second set of uplink symbols, wherein the deferment scheme includes deferral of the first set of feedback bits and the second set of feedback bits from the first set of uplink symbols.

15. The method of claim 13, further comprising:

receiving, according to the deferment scheme, the first set of feedback bits in the first set of uplink symbols; and receiving, according to the deferment scheme, the second set of feedback bits in the second set of uplink symbols, wherein the deferment scheme includes deferral of only the first set of feedback bits from the first set of uplink symbols.

16. The method of claim 13, further comprising:

identifying a preparation time associated with the UE generating a feedback codebook that includes only one of the first set of feedback bits or the second set of feedback bits, wherein the deferment scheme is based at least in part on the preparation time.

17. The method of claim 13, further comprising:

identifying an expiration time for receipt of the first set of feedback bits, the second set of feedback bits, or both, wherein the deferment scheme is based at least in part on the expiration time.

18. The method of claim 13, further comprising:

identifying a third set of feedback bits scheduled to be received from the UE in the second set of uplink symbols, wherein the deferment scheme is based at least in part on whether the second set of uplink symbols is within a threshold time window and is sufficient for transmission of all of the first set of feedback bits, the second set of feedback bits, and the third set of feedback bits.

19. The method of claim 13, wherein the deferment scheme is based at least in part on whether the second set of uplink symbols is within a threshold time window and sufficient for transmission of all of the first set of feedback bits and the second set of feedback bits.

20. The method of claim 13, further comprising:

transmitting downlink control information to the UE indicating the deferment scheme.

21. The method of claim 13, further comprising:

transmitting radio resource control signaling configuring the deferment scheme in conjunction with at least one of the first semi-persistent scheduling configuration or the second semi-persistent scheduling configuration.

22. The method of claim 21, further comprising:

transmitting downlink control information to the UE indicating an updated deferment scheme that overrides the radio resource control signaling configuring the deferment scheme used for transmitting the first set of feedback bits and the second set of feedback bits.

23. The method of claim 13, further comprising:

transmitting the deferment scheme on a per-semi-persistent scheduling configuration basis.

24. An apparatus for wireless communication at a user equipment (UE), comprising:

at least one processor; and memory coupled with the at least one processor, the memory storing instructions executable by the at least one processor to cause the UE to:

generate a first set of feedback bits associated with a first set of downlink transmissions of a first semi-persistent scheduling configuration and a second set of feedback bits associated with a second set of downlink transmissions of a second semi-persistent scheduling configuration, the first semi-persistent scheduling configuration different from the second semi-persistent scheduling configuration, both the first set of feedback bits and the second set of feedback bits scheduled for transmission to a network entity in a first set of uplink symbols;

identify that only a subset of the first set of uplink symbols is available for transmission of the first set of feedback bits and the second set of feedback bits;

determine to defer transmission of one of the first set of feedback bits or the second set of feedback bits or both of the first set of feedback bits and the second set of feedback bits to a second set of uplink symbols based at least in part on the identifying and on a deferment scheme; and transmit the first set of feedback bits and the second set of feedback bits to the network entity in accordance with the deferment scheme.

25. The apparatus of claim 24, wherein the instructions to transmit the first set of feedback bits and the second set of feedback bits are further executable by the at least one processor to cause the UE to:

deferring, accord to the deferment scheme, transmission of the first set of feedback bits and the second set of feedback bits in the first set of uplink symbols; and transmit, according to the deferment scheme, the first set of feedback bits and the second set of feedback bits in the second set of uplink symbols.

26. The apparatus of claim 24, wherein the instructions to transmit the first set of feedback bits and the second set of feedback bits are further executable by the at least one processor to cause the UE to:

transmit, according to the deferment scheme, the first set of feedback bits in the first set of uplink symbols;

deferring, accord to the deferment scheme, transmission of the second set of feedback bits in the first set of uplink symbols; and transmit, according to the deferment scheme, the second set of feedback bits in the second set of uplink symbols.

27. The apparatus of claim 24, wherein the instructions are further executable by the at least one processor to cause the UE to:

identify a preparation time associated with generating a feedback codebook that includes only one of the first set of feedback bits or the second set of feedback bits, wherein the deferment scheme is based at least in part on the preparation time.

28. The apparatus of claim 24, wherein the instructions are further executable by the at least one processor to cause the UE to:

identify an expiration time for transmission of the first set of feedback bits, the second set of feedback bits, or both, wherein the deferment scheme is based at least in part on the expiration time.

29. An apparatus for wireless communication at a network entity, comprising:

at least one processor; and memory coupled with the at least one processor, the memory storing instructions executable by the at least one processor to cause the network entity to:

transmit, to a user equipment (UE), a first set of downlink transmissions in accordance with a first semi-persistent scheduling configuration and a second set of downlink transmissions in accordance with a second semi-persistent scheduling configuration, the first semi-persistent scheduling configuration different from the second semi-persistent scheduling configuration, the first set of downlink transmissions associated with a first set of feedback bits and the second set of downlink transmissions associated with a second set of feedback bits, both the first set of feedback bits and the second set of feedback bits scheduled for transmission to the network entity in a first set of uplink symbols;

identify that only a subset of the first set of uplink symbols is available for transmission of the first set of feedback bits and the second set of feedback bits;

determine that the UE is to defer transmission of one of the first set of feedback bits or the second set of feedback bits or both of the first set of feedback bits and the second set of feedback bits to a second set of uplink symbols based at least in part on the identifying and on a deferment scheme; and monitor for the first set of feedback bits and the second set of feedback bits in accordance with the deferment scheme.

30. The apparatus of claim 29, wherein the instructions are further executable by the at least one processor to cause the network entity to:

receive, according to the deferment scheme, the first set of feedback bits and the second set of feedback bits in the second set of uplink symbols, wherein the deferment scheme includes deferral of the first set of feedback bits and the second set of feedback bits from the first set of uplink symbols.

* * * * *